(12) United States Patent
Byun

(10) Patent No.: US 11,086,537 B2
(45) Date of Patent: Aug. 10, 2021

(54) METHOD AND SYSTEM TO PERFORM URGENCY LEVEL GARBAGE COLLECTION BASED ON WRITE HISTORY OF MEMORY BLOCKS

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/575,642

(22) Filed: Sep. 19, 2019

(65) Prior Publication Data

US 2020/0174668 A1 Jun. 4, 2020

(30) Foreign Application Priority Data

Nov. 29, 2018 (KR) .......................... 10-2018-0150684

(51) Int. Cl.
*G06F 12/00* (2006.01)
*G06F 3/06* (2006.01)
*G06F 12/02* (2006.01)

(52) U.S. Cl.
CPC ............ *G06F 3/064* (2013.01); *G06F 3/0604* (2013.01); *G06F 3/0652* (2013.01); *G06F 3/0679* (2013.01); *G06F 12/0253* (2013.01); *G06F 2212/7205* (2013.01)

(58) Field of Classification Search
CPC .. G06F 12/0253; G06F 3/0652; G06F 3/0679; G06F 3/0604; G06F 2212/7205; G06F 3/064
See application file for complete search history.

(56) References Cited

U.S. PATENT DOCUMENTS

| 10,489,291 | B2* | 11/2019 | Hsu .......................... G06F 3/064 |
| 2014/0032817 | A1* | 1/2014 | Bux ..................... G06F 12/0261 |
| | | | 711/103 |
| 2015/0347296 | A1* | 12/2015 | Kotte .................... G06F 3/0679 |
| | | | 711/103 |
| 2016/0139812 | A1* | 5/2016 | Zhang ..................... G06F 3/064 |
| | | | 711/103 |

FOREIGN PATENT DOCUMENTS

| KR | 10-1539895 | 7/2015 |
| KR | 10-2017-0003776 | 1/2017 |
| KR | 10-2017-0046767 | 5/2017 |

OTHER PUBLICATIONS

Zhang, ParaFS: A Log-Structured File System to Exploit the Internal Parallelism of Flash Devices (Year: 2016).*

* cited by examiner

*Primary Examiner* — Arvind Talukdar
(74) *Attorney, Agent, or Firm* — IP & T Group LLP

(57) ABSTRACT

A memory system may include: a memory device including a plurality of memory blocks; and a controller configured to control the memory device, wherein the controller comprises: a block level manager configured to determine a level for each of the plurality of memory blocks based on write history of writing data to the memory device, and manage a cold block based on the level; and a garbage collection manager configured to determine a garbage collection urgent level based on a result of comparing a free block count and a first threshold value, and manage whether to perform a garbage collection operation for the cold block based on the determined garbage collection urgent level.

28 Claims, 17 Drawing Sheets

| SEQUENCE NUMBER | BLOCK LIST | LEVEL |
|---|---|---|
| SN 1 | BL 12 | 1 |
| SN 2 | BL 20 | 1 |
| SN 3 | BL 31 | 1 |
| SN 4 | BL 4 | 2 |
| SN 5 | BL 54 | 2 |
| SN 6 | BL 6 | 2 |
| SN 7 | BL 73 | 3 |
| SN 8 | BL 80 | 3 |
| SN 9 | BL 91 | 3 |

METHOD AND SYSTEM TO PERFORM URGENCY LEVEL GARBAGE COLLECTION BASED ON WRITE HISTORY OF MEMORY BLOCKS

CROSS-REFERENCE TO RELATED APPLICATION

This application claims priority under 35 U.S.C. § 119 to Korean Patent Application No. 10-2018-0150684 filed on Nov. 29, 2018, which is incorporated herein by reference in its entirety.

BACKGROUND

1. Field

Various embodiments of the present invention generally relate to a memory device. Particularly, the embodiments relate to a memory system, and an operating method thereof.

2. Discussion of the Related Art

Recently, the paradigm for the computer environment has shifted to ubiquitous computing, which allows computer systems to be used anytime and anywhere. As a result, the use of portable electronic devices such as mobile phones, digital cameras, and laptop computers has rapidly increased. In general, such portable electronic devices use a memory system including a memory device, that is, a data storage device. The data storage device is used as a main memory device or an auxiliary memory device of the portable electronic devices.

SUMMARY

Various embodiments are directed to an internal operating method for a nonvolatile memory device, and more particularly, to a method of operating a memory system for efficiently performing a garbage collection operation on a nonvolatile memory block included in the nonvolatile memory device, and a memory system including a memory controller and a nonvolatile memory device capable of performing the method.

In an embodiment, a memory system may include: a memory device including a plurality of memory blocks; and a controller configured to control the memory device, wherein the controller comprises: a block level manager configured to determine a level for each of the plurality of memory blocks based on write history of writing data to the memory device, and manage a cold block based on the level; and a garbage collection manager configured to determine a garbage collection urgent level based on a result of comparing a free block count and a first threshold value, and manage whether to perform a garbage collection operation for the cold block based on the determined garbage collection urgent level.

In an embodiment, a method of operating a memory system including a memory device including a plurality of memory blocks, and a controller configured to control the memory device may include: determining a level for each of the plurality of memory blocks based on write history of writing data to the memory device, and managing a cold block based on the level; and determining a garbage collection urgent level based on a result of comparing a free block count and a first threshold value, and managing whether to perform a garbage collection operation for the cold block based on the determined garbage collection urgent level.

In an embodiment, an operating method of a controller, the operating method may comprise: identifying first memory blocks having an older write history than second memory blocks among plural memory blocks within a memory device; and controlling the memory device to perform a first garbage collection operation by selecting a victim block among the first memory blocks according to urgency of a garbage collection operation.

DETAILED DESCRIPTION

Various embodiments of the invention are described below in more detail with reference to the accompanying drawings. It is noted, however, that the invention may be embodied in different forms. Moreover, aspects and features of the present invention may be configured or arranged differently than shown in the illustrated embodiments. Thus, the present invention is not to be construed as being limited to the embodiments set forth herein. Rather, the described embodiments are provided so that this disclosure is thorough and complete and fully conveys the present invention to those skilled in the art to which this invention pertains. Also, throughout the specification, reference to "an embodiment," "another embodiment" or the like is not necessarily to only one embodiment, and different references to any such phrase are not necessarily to the same embodiment(s).

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Various embodiments of the present invention are described in detail below with reference to the attached drawings.

Figure 1:
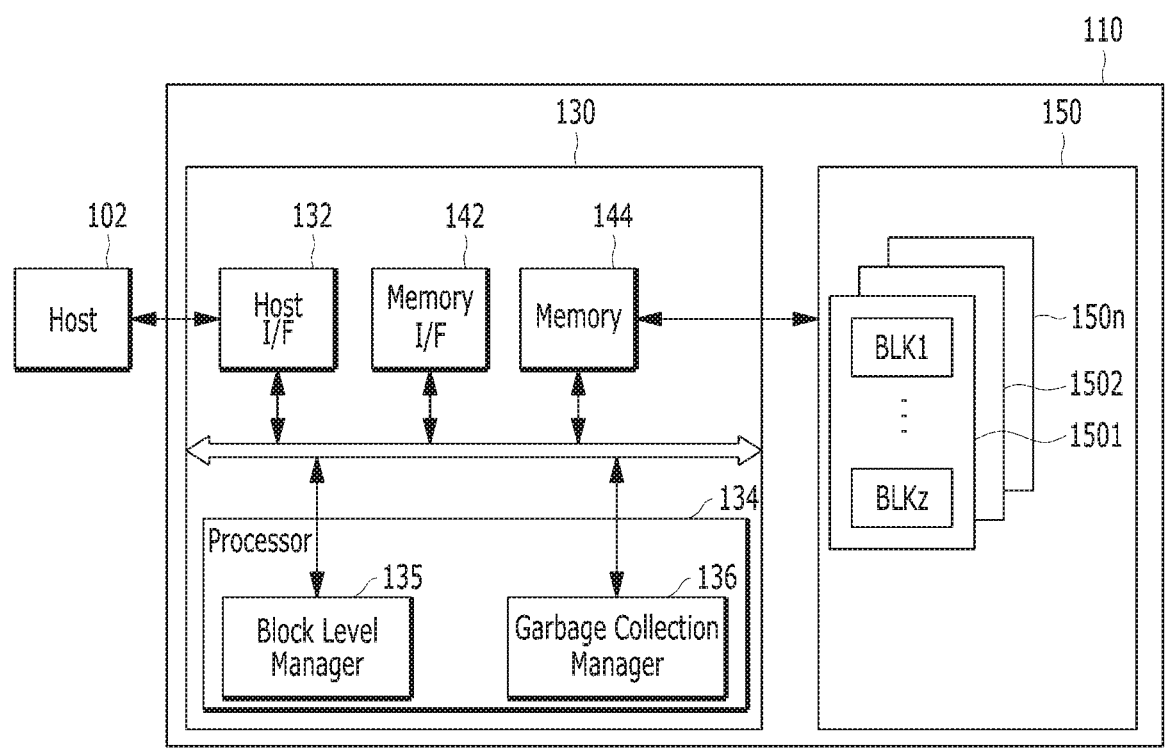
FIG. 1 is a block diagram schematically illustrating a data processing system including a memory system in accordance with an embodiment.

FIG. 1 is a block diagram illustrating a data processing system 100 including a memory system in accordance with an embodiment.

Referring to FIG. 1, the data processing system 100 may include a host 102 and a memory system 110.

The host 102 may be embodied by any of various electronic devices, for example, electronic devices such as a mobile phone, an MP3 player, a laptop computer, a desktop computer, a gaming device, a television (TV), a projector, that is, wired and wireless electronic devices.

Also, the host 102 includes at least one operating system (OS). The operating system generally manages and controls the functions and operations of the host 102, and provides interoperability between the host 102 and a user using the data processing system 100 or the memory system 110. The operating system supports functions and operations corresponding to the user's purpose of use and the use of the operating system. For example, the operating system may be a general operating system or a mobile operating system depending on design, for example, the mobility of the host 102. The general operating system may be a personal operating system or an enterprise operating system depending on design, for example, the user's usage environment. For example, the personal operating system configured to support a service providing function for a general user may include Windows and Chrome, and the enterprise operating system configured to secure and support high performance may include Windows server, Linux and Unix. The mobile operating system configured to support a mobility service providing function and a system power saving function to users may include Android, iOS, Windows mobile, etc. The host 102 may include a plurality of operating systems, and executes the operating systems to perform operations with the memory system 110 corresponding to a user request. The host 102 transmits a plurality of commands corresponding to a user request to the memory system 110, and accordingly, the memory system 110 performs operations corresponding to the commands, that is, operations corresponding to the user request.

The memory system 110 operates in response to a request of the host 102, and, in particular, stores data to be accessed by the host 102. In other words, the memory system 110 may be used as a main memory device or an auxiliary memory device of the host 102. The memory system 110 may be implemented as any one of various types of storage devices, depending on a host interface protocol which is coupled with the host 102. For example, the memory system 110 may be implemented as any one of a solid state driver (SSD), a multimedia card (e.g., an MMC, an embedded MMC (eMMC), a reduced size MMC (RS-MMC) and a micro-MMC), a secure digital card (e.g., an SD, a mini-SD and a micro-SD), a universal serial bus (USB) storage device, a universal flash storage (UFS) device, a compact flash (CF) card, a smart media card, and a memory stick.

Any of the storage devices which implement the memory system 110 may be a volatile memory device. By way of example and not limitation, the volatile memory device may include dynamic random access memory (DRAM) and/or a static random access memory (SRAM), or a nonvolatile memory device such as a read only memory (ROM), a mask ROM (MROM), a programmable ROM (PROM), an erasable programmable ROM (EPROM), an electrically erasable and programmable ROM (EEPROM), an ferroelectric random access memory (FRAM), a phase change RAM (PRAM), a magnetic RAM (MRAM) and/or a resistive RAM (RRAM).

The memory system 110 includes a memory device 150 which stores data to be accessed by the host 102, and a controller 130 which controls storage of data in the memory device 150.

The controller 130 and the memory device 150 may be integrated into one semiconductor device. For instance, the controller 130 and the memory device 150 may be integrated into one semiconductor device and configure a solid state drive (SSD). In the case where the memory system 110 is used as an SSD, the operating speed of the host 102 which is coupled to the memory system 110 may be improved. The controller 130 and the memory device 150 may be integrated into one semiconductor device to form a memory card such as a personal computer memory card international association (PCMCIA) card, a compact flash (CF) card, a smart media card (e.g., an SM and an SMC), a memory stick, a multimedia card (e.g., an MMC, an RS-MMC and a micro-MMC), a secure digital card (e.g., an SD, a mini-SD, a micro-SD and an SDHC), and/or a universal flash storage (UFS) device.

In another embodiment, the memory system 110 may be disposed in a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various component elements configuring a computing system.

The memory device 150 may retain stored data even though power is not supplied. In particular, the memory device 150 stores the data provided from the host 102 through a write operation, and provides stored data to the host 102 through a read operation. The memory device 150 includes a plurality of memory dies 1501 to 150n.

Each of the plurality of memory dies 1501 to 150n includes a plurality of memory blocks BLK1 to BLKz, each of which includes a plurality of pages. Each of the pages includes a plurality of memory cells to which a plurality of word lines (WL) are coupled. Also, the memory device 150 includes a plurality of planes, each of which includes a plurality of memory blocks, e.g., blocks BLK1 to BLKz. In particular, the memory device 150 may include a plurality of memory dies 1501 to 150n, each of which includes a plurality of planes. The memory device 150 may be a nonvolatile memory device, for example, a flash memory. The flash memory may have a three-dimensional (3D) stack structure.

The controller 130 controls the memory device 150 in response to a request from the host 102. For example, the controller 130 provides the data read from the memory device 150, to the host 102, and stores the data provided from the host 102, in the memory device 150. To this end, the controller 130 controls the operations of the memory device 150, such as read, write, program, and erase operations.

According to an embodiment, the controller 130 includes a host interface (I/F) 132, a processor 134, a memory interface (I/F) 142 and a memory 144.

The host interface 132 is for handling commands, data, and the like transmitted from the host 102. By way of example but not limitation, the host interface 132 can include a command queue. The command queue can sequentially store at least some of commands, data, or the like transmitted from the host 102 and output them to a cache controller 145 in their stored order.

The host interface 132 processes the commands and data of the host 102, and may be configured to communicate with the host 102 through at least one of various interface protocols such as universal serial bus (USB), multimedia card (MMC), peripheral component interconnect express (PCI-e or PCIe), serial attached SCSI (SAS), serial advanced technology attachment (SATA), parallel advanced technology attachment (PATA), small computer system interface (SCSI), enhanced small disk interface (ESDI), integrated drive electronics (IDE) and mobile industry processor interface (MIPI). The host interface 32 may be driven through firmware referred to as a host interface layer (HIL), which is a region which exchanges data with the host 102.

The memory interface 142 serves as a memory interface and/or storage interface which performs interfacing between the controller 130 and the memory device 150 to allow the controller 130 to control the memory device 150 in response to a request from the host 102. The memory interface 142 generates control signals for the memory device 150 and processes data according to the control of the processor 134, such as a NAND flash controller (NFC) in the case where the memory device 150 is a flash memory, in particular, in the case where the memory device 150 is a NAND flash memory. The memory interface 142 may support the operation of an interface which processes a command and data between the controller 130 and the memory device 150, for example, a NAND flash interface, in particular, data input/output between the controller 130 and the memory device 150. The memory interface 142 may be driven through firmware, referred to as a flash interface layer (FIL), which is a region which exchanges data with the memory device 150.

The memory 144, such as the working memory of the memory system 110 and the controller 130, stores data for driving of the memory system 110 and the controller 130. For example, when the controller 130 controls the memory device 150 in response to a request from the host 102, the controller 130 may provide data read from the memory device 150 to the host 102, and/or store data provided from the host 102 in the memory device 150. To this end, when the controller 130 controls the operations of the memory device 150, such as read, write, program and erase operations, the memory 144 stores data needed to allow such operations to be performed by the memory system 110, that is, between the controller 130 and the memory device 150.

The memory 144 may be realized by a volatile memory. For example, the memory 144 may be realized by a static random access memory (SRAM) or a dynamic random access memory (DRAM). Furthermore, the memory 144 may be disposed within the controller 130 as shown in FIG. 1. Alternatively, the memory 144 may be external to the controller 130, and in this regard, may be realized as a separate external volatile memory in communication with the controller 130 through a memory interface.

As described above, the memory 144 stores data to perform data read and write operations between the host 102 and the memory device 150, and data when performing the data read and write operations. For such data storage, the memory 144 may include a program memory, a data memory, a write buffer/cache, a read buffer/cache, a data buffer/cache, a map buffer/cache, and the like.

The processor 134 controls various operations of the memory system 110. In particular, the processor 134 controls a program operation or a read operation for the memory device 150, in response to a write request or a read request from the host 102. The processor 134 drives firmware, referred to as a flash translation layer (FTL), to control the general operations of the memory system 110. The processor 134 may be more than one processor, each of which may be realized by a microprocessor or a central processing unit (CPU).

For instance, the controller 130 performs an operation requested from the host 102, in the memory device 150, that is, performs a command operation corresponding to a command received from the host 102, with the memory device 150, through the processor 134 embodied by a microprocessor or a central processing unit (CPU). The controller 130 may perform a foreground operation such as a command operation corresponding to a command received from the host 102. For example, the foreground operation includes a program operation corresponding to a write command, a read operation corresponding to a read command, an erase operation corresponding to an erase command, or a parameter set operation corresponding to a set parameter command or a set feature command as a set command.

According to an embodiment, the processor 134 may include a block level manager 135 and a garbage collection manager 136. The block level manager 135 and the garbage collection manager 136 may be driven by the processor 134.

In general, the amount of invalid data stored in a nonvolatile memory area of a nonvolatile memory device may generally increase due to iterated write commands. To reuse a memory block in which the invalid data is stored, an internal operation (e.g., a garbage collection operation, and a wear leveling operation) may be performed. For example, the controller 130 may perform a garbage collection operation to change the memory block in which the invalid data is stored into a free block. In detail, a method of performing the garbage collection operation may include selecting, by the controller, a victim block including valid pages the number of which is less than a predetermined threshold value among a plurality of source blocks. Here, the reason why the victim block having a small number of valid pages is selected is that, during a process of copying the valid pages included in the victim block to a target block to change data included in the valid pages into invalid data, if the number of valid pages is relatively large, time and cost required to perform the garbage collection operation may be increased. After valid pages included in the victim block are copied to a target block which is a free block, the victim block may become a free block. Here, to efficiently perform the garbage collection operation, margin space is needed in a memory area of the memory device. The margin space may be referred to as "over provisioning (OP) space". The OP space is space obtained by setting one or more pages as the margin space in a block at a predetermined ratio. The OP space may be preliminary space prepared to reliably perform essential operations, e.g., a wear leveling operation, a garbage collection operation, and a bad block management operation, for the operation of the SSD. However, if a source block including the OP space is not selected as a victim block, the OP space included in the source block may not be used, and the performance thereof may be gradually reduced.

To solve this, the processor 134 may set, through the block level manager 135, a level for each memory block according to write history of the memory block, and manage a cold block. Furthermore, the processor 134 may also perform, through the garbage collection manager 136, the garbage collection operation on the cold block depending on a free block count. In this regard, the block level manager 135 and the garbage collection manager 136 will be described in detail with reference to FIGS. 5 and 6.

Various embodiments may provide a memory system which is interlocked with the host and includes at least one processor and at least one storage device including a program command. For example, the at least one processor and the at least one storage device including the program command may be implemented as the memory 144 and the processor 134 that are included in the controller 130.

Figure 2:
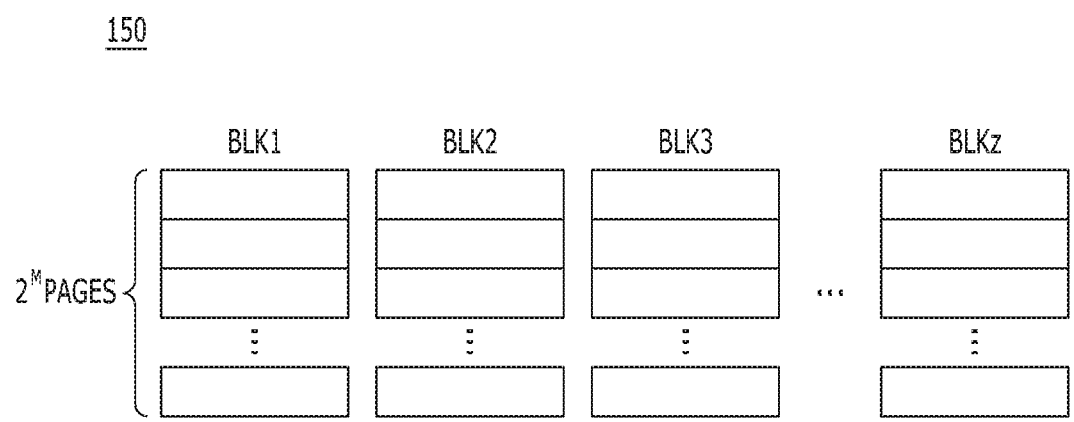
FIG. 2 is a schematic diagram illustrating a configuration of a memory device employed in the memory system shown in FIG. 1.

FIG. 2 is a schematic diagram illustrating a configuration of a memory device employed in the memory system shown in FIG. 1.

Referring to FIG. 2, the memory device 150 includes a plurality of memory blocks, for example, a first block BLK1, a second block BLK2, a third block BLK3 and an (z)th block BLKz−1. Each of the blocks BLK1 to BLKz may include a plurality of pages, for example, $2^M$ or M pages. Each of the pages includes a plurality of memory cells to which a plurality of word lines (WL) are coupled.

The memory device 150 may include single level cell (SLC) memory blocks and/or multi-level cell (MLC) memory blocks, depending on the number of bits to be stored in or expressed by one memory cell. An SLC memory block includes a plurality of pages which are realized by memory cells each storing 1 bit, and has high data calculation performance and high durability. An MLC memory block includes a plurality of pages which are realized by memory cells each storing multi-bit data (for example, 2 or more bits), and has a larger data storage space than the SLC memory block, that is, is capable of being highly integrated. In particular, the memory device 150 may include, as MLC memory blocks, an MLC memory block including a plurality of pages which are realized by memory cells each capable of storing 2-bit data, a triple level cell (TLC) memory block including a plurality of pages which are realized by memory cells each capable of storing 3-bit data, a quadruple level cell (QLC) memory block including a plurality of pages which are realized by memory cells each capable of storing 4-bit data, or a multiple level cell memory block including pages which are realized by memory cells each capable of storing 5 or more-bit data.

While it is described as an example that the memory device 150 is realized by a nonvolatile memory such as a flash memory, for example, a NAND flash memory, it is noted that the memory device 150 may be implemented as any of multiple types of memories such as a phase change memory (i.e., phase change random access memory (PCRAM)), a resistive memory (i.e., resistive random access memory (RRAM or ReRAM)), a ferroelectric memory (i.e., ferroelectric random access memory (FRAM)) and a spin transfer torque magnetic memory (i.e., spin transfer torque magnetic random access memory (STT-RAM or STT-MRAM)).

Each of the memory blocks BLK1 to BLKz stores the data provided from the host 102 of FIG. 1, through a write operation, and provides stored data to the host 102, through a read operation.

Figure 3:
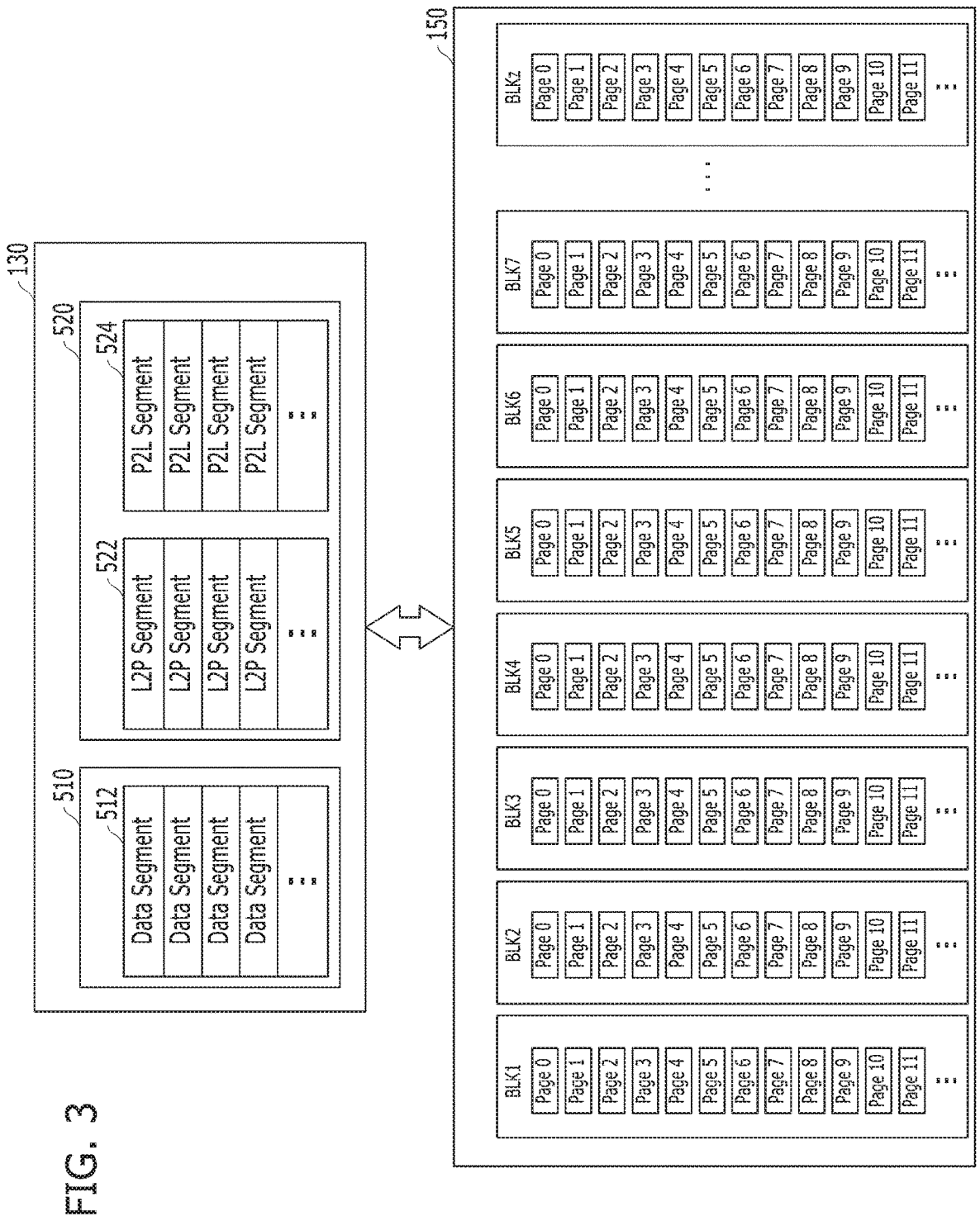
FIG. 3 is a diagram illustrating a data processing operation with respect to a memory device in a memory system in accordance with an embodiment.

FIG. 3 is a diagram illustrating a data processing operation with respect to a memory device in a memory system in accordance with an embodiment.

Referring to FIG. 3, the controller 130 performs a command operation corresponding to a command received from the host 102, for example, a program operation corresponding to a program command. The controller 130 programs and stores user data corresponding to the program command in the plurality of pages in memory blocks BLK1 to BLKz of the memory device 150. The controller 130 generates and updates metadata for the user data, and programs and stores the metadata in the memory blocks BLK1 to BLKz of the memory device 150. The metadata may include logical to physical (logical/physical or L2P) information and physical to logical (physical/logical or P2L) information for the user data stored in the memory blocks BLK1 to BLKz. Also, the metadata may include information on command data corresponding to a command received from the host 102, information on a command operation corresponding to the command, information on the memory blocks of the memory device 150 for which the command operation is to be performed, and information on map data corresponding to the command operation. The metadata may include various information and data, excluding user data, corresponding to a command received from the host 102.

For example, the controller 130 caches and buffers user data corresponding to a program command received from the host 102, a first buffer 510 of the controller 130. That is, the controller 130 stores data segments 512 of the user data in the first buffer 510 as a data buffer/cache. The first buffer 510 may be included in the memory 144 of the controller 130. Thereafter, the controller 130 programs and stores the data segments 512 stored in the first buffer 510, in the pages included in the memory blocks BLK1 to BLKz of the memory device 150.

As the data segments 512 of the user data are programmed and stored in the pages in the memory blocks BLK1 to BLKz, the controller 130 generates L2P segments 522 and P2L segments 524 as metadata. The controller 130 may store the L2P segments 522 and the P2L segments 524 in a second buffer 520 of the controller 130. The second buffer 520 may be included in the memory 144 of the controller 130. In the second buffer 520, the L2P segments 522 and the P2L segments 524 may be stored in the form of a list. Then, the controller 130 programs and stores the L2P segments 522 and the P2L segments 524 in the pages in the memory blocks BLK1 to BLKz through a map flush operation.

The controller 130 performs a command operation corresponding to a command received from the host 102. For example, the controller 130 performs a read operation corresponding to a read command. The controller 130 checks L2P segments 522 and P2L segments 524 of user data corresponding to the read command by loading them in the second buffer 520. Then, the controller 130 reads data segments 512 of the user data from a storage position obtained through the checking. That is, the controller 130 reads the data segments 512 from a specific page of a specific memory block among the memory blocks BLK1 to BLKz. Then, the controller 130 stores the data segments 512 in the first buffer 510, and provides the data segments 512 to the host 102.

Referring back to FIG. 1, the memory system 110 may include a controller 130 and a memory device 150.

The controller 130 may include a memory 144 and a cache controller 145. Further, the controller 130 may include the host interface 132, the processor 134 and the memory interface 142. The cache controller 145 may be driven by the processor 134.

As used in the disclosure, the term 'component' can refer to all of the following: (a) hardware-only circuit implementations (such as implementations in only analog and/or digital component) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'component' applies to all uses of this term in this application, including in any claims. As a further example, as used in this application, the term "component" would also cover an implementation of merely a processor (or multiple processors) or portion of a processor and its (or their) accompanying software and/or firmware. The term "component" would also cover, for example and if applicable to a particular claim element, an integrated circuit for a storage device.

Figure 4:
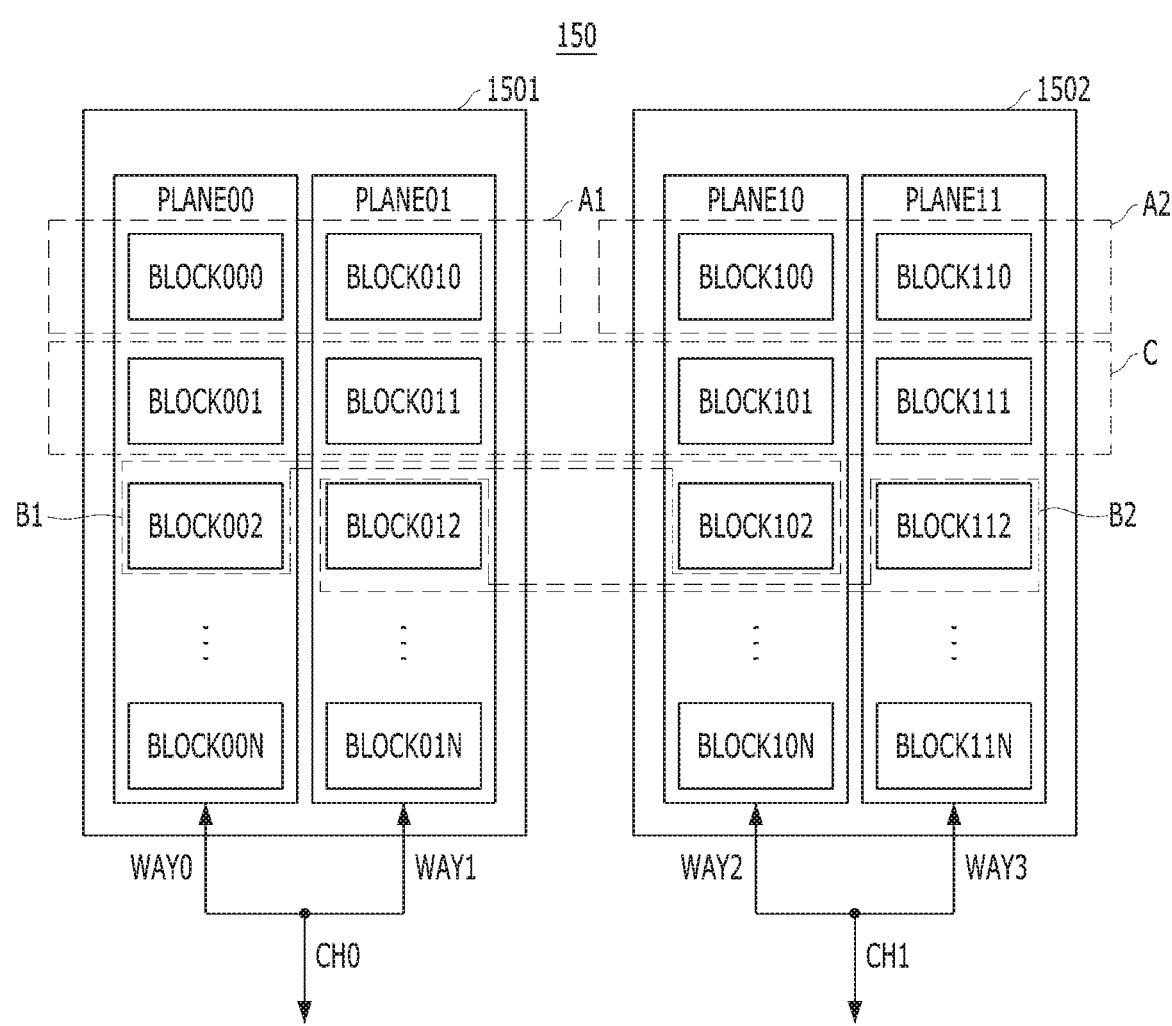
FIG. 4 is a diagram illustrating the concept of a super memory block used in a memory system in accordance with an embodiment.

FIG. 4 is a diagram illustrating the concept of a super memory block used in a memory system in accordance with an embodiment.

FIG. 4 illustrates memory dies 1501 to 150n included in the memory device, such as the memory device 150 of FIG. 1, among the components of the memory system 110, in accordance with an embodiment. For example, the memory device 150 may include a first memory die 1501 and a second memory die 1502.

Each of the first and second memory dies 1501 and 1502 may include a plurality of planes. For example, the first memory die 1501 may include a first plane PLANE00 and a second plane PLANE01, and the second memory die 1502 may include a third plane PLANE10 and a fourth plane PLANE11. Each of the planes may include a plurality of blocks. For example, the first plane PLANE00 may include first to $N^{th}$ memory blocks BLOCK000 to BLCOK00N, and the second plane PLANE01 may include first to $N^{th}$ memory blocks BLOCK010 to BLCOK01N. The third plane PLANE10 may include first to $N^{th}$ memory blocks BLOCK100 to BLCOK10N, and the fourth plane PLANE11 may include first to $N^{th}$ memory blocks BLOCK110 to BLCOK11N.

The first memory die 1501 is capable of inputting/outputting data through a zeroth channel CH0, and the second memory die 1502 is capable of inputting/outputting data through a first channel CH1. The zeroth channel CH0 and the first channel CH1 may input/output data in an interleaving scheme.

The first memory die 1501 includes the plurality of planes PLANE00 and PLANE01 corresponding to a plurality of ways WAY0 and WAY1, respectively, capable of inputting/outputting data in the interleaving scheme by sharing the zeroth channel CH0.

The second memory die 1502 includes the plurality of planes PLANE10 and PLANE11 corresponding to a plurality of ways WAY2 and WAY3, respectively, capable of inputting/outputting data in the interleaving scheme by sharing the first channel CH1.

The plurality of memory blocks in the memory device 150 may be divided into groups based on physical locations where the same way or channel is used.

While the embodiment of FIG. 4 shows, as an example, a configuration of the memory device 150 in which there are two dies, each having two planes, the present invention is not limited to this configuration. Any suitable die and plane configuration may be used based on system design considerations. The number of memory blocks in each plane may vary as well.

The controller 130 may group memory blocks which can be selected simultaneously, among the plurality of memory blocks in different dies or different planes, based on their physical locations, and manage the memory block groups as super memory blocks.

The scheme in which the controller 130 groups the memory blocks into super memory blocks and manages the super memory blocks may be performed in various ways according to a designer's selection. Three schemes are described below as examples.

For example, a first scheme is that the controller 130 groups an arbitrary memory block BLOCK000 of the first plane PLANE00 and an arbitrary memory block BLOCK010 of the second plane PLANE01 in the first memory die of the plurality of memory dies 1501 and 1502 in the memory device 150, and manages the grouped memory blocks BLOCK000 and BLOCK010 as a single super memory block A1. When the first scheme is applied to the second memory die 1502 in the memory device 150, the controller 130 may group an arbitrary memory block BLOCK100 of the first plane PLANE10 and an arbitrary memory block BLOCK110 of the second plane PLANE11 in the second memory die 1502, and manage the grouped memory blocks BLOCK100 and BLOCK110 as a single super memory block A2.

For example, a second scheme is that the controller 130 groups an arbitrary memory block BLOCK002 in the first plane PLANE00 of the first memory die 1501 and an arbitrary memory block BLOCK102 in the first plane PLANE10 of the second memory die 1502, and manages the grouped memory blocks BLOCK002 and BLOCK102 as a single super memory block B1. In addition, according to the second scheme, the controller 130 may group an arbitrary memory block BLOCK012 in the second plane PLANE01 of the first memory die 1501 and an arbitrary memory block BLOCK112 in the second plane PLANE11 of the second memory die 1502, and manage the grouped memory blocks BLOCK012 and BLOCK112 as a single super memory block B2.

For example, a third scheme is that the controller 130 groups an arbitrary memory block BLOCK001 in the first plane PLANE00 of the first memory die 1501, an arbitrary memory block BLOCK011 included in the second plane PLANE01 of the first memory die 1501, an arbitrary memory block BLOCK101 in the first plane PLANE10 of the second memory die 1502, and an arbitrary memory block BLOCK111 in the second plane PLANE11 of the second memory die 1502, and manages the grouped memory blocks BLOCK001, BLOCK011, BLOCK101 and BLOCK111 as a single super memory block C.

Accordingly, simultaneously-selectable memory blocks included in each of the super memory blocks may be substantially simultaneously selected through the interleaving scheme, for example, a channel interleaving scheme, a memory die interleaving scheme, a memory chip interleaving scheme, or a way interleaving scheme.

Figure 5:
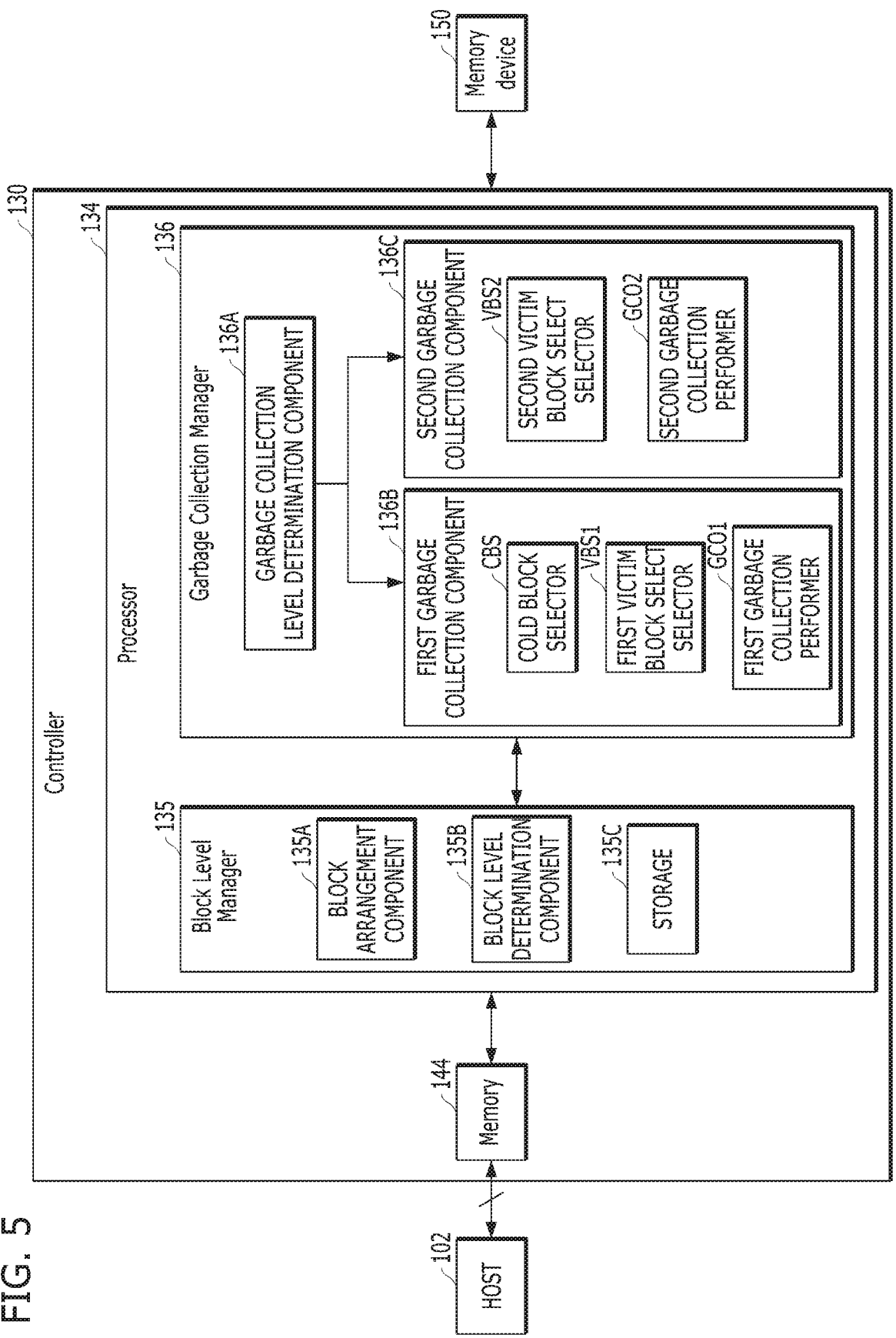
FIG. 5 is a block diagram illustrating in more detail a processor of FIG. 1.
Figures 6A, 6B:
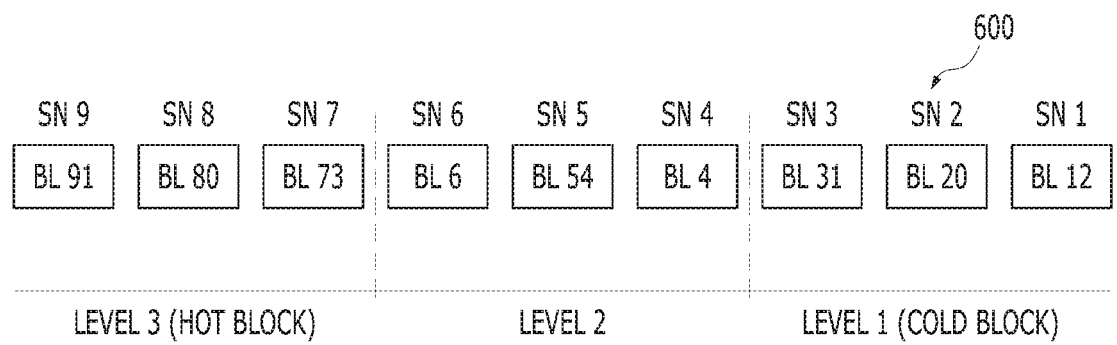
FIGS. 6A and 6B are diagrams for describing an operation of a block level manager in accordance with an embodiment.

FIG. 5 is a block diagram illustrating in more detail the processor, such as the processor 134 of FIG. 1. FIGS. 6A and 6B are diagrams for describing an operation of a block level manager in accordance with an embodiment.

Referring to FIG. 5, the block level manager 135 may include a block arrangement component 135A, a block level determination component 135B, and a storage 135C. A plurality of memory blocks included in the memory device 150 may be divided into a free block, an open or active block, and a source block. Here, the free block may refer to a block in which no data is stored, the open block may refer to a block in which data is stored and a page capable of writing data thereto remains, and a source block may refer to a block in which data is stored and all pages capable of writing data thereto have been exhausted. That is, an empty page capable of writing data is not present in the source block.

The block arrangement component 135A may allocate sequence numbers (SN) to the plurality of respective source blocks in ascending order based on a write history of the memory device. A sequence number is allocated to each of the plurality of source blocks in order to indicate the write history of the plurality of source blocks through the sequence numbers which function as time stamps. Here, each time an open block becomes a source block, the block arrangement component 135A may allocate a sequence number SN to the source block, or reallocate the sequence number SN to a source block, which is updated among source blocks that have been provided with the sequence numbers SN. A source block may be updated when metadata of the source block is changed. For example, when data stored in the source block is updated and thus programmed into another block, data stored in the source block may become invalid and the metadata of the source block may be updated to reflect the invalidation of the data stored in the source block. The block arrangement component 135A may allocate the sequence number SN to each of the plurality of memory blocks in ascending order according to the write history of the source blocks represented by the sequence numbers. Each time a sequence number SN is allocated to each of the source blocks, the sequence number SN increases by 1. In this way, the sequence numbers SN may be allocated to the source blocks. The sequence numbers SN of the source blocks may indicate the write history of the source blocks.

The block level determination component 135B may set a level for each source block according to the corresponding sequence number SN. The block level determination component 135B may set one of a plurality of levels for the source block based on the sequence number representing the write history. For example, the plurality of levels are classified into a level 1 section, a level 2 section, and a level 3 section. The source blocks of a lower level may belong to a lower one among the level sections. As described above, the block arrangement component 135A may allocate the sequence number SN to each of the plurality of memory blocks in ascending order according to the write history of the source blocks represented by the sequence numbers. Therefore, as the level approaches the level 1 section, the corresponding source block may be close to a cold block. The level 1 section may be a section in which source blocks each having the oldest write history belong. Recently changed source blocks may belong to the level 3 section as hot blocks. Criteria for classifying the levels into respective sections may be set in various ways. First, the level sections may be classified into level 1 to level 3 sections by setting a predetermined update period for each level. In detail, a recently become source block may belong to the level 3 section. Among source blocks belonging to the level 3 section, the level of a source block that has not been changed for a first predetermined period may be changed to belong to the level 2 section. Likewise, among source blocks belonging to the level 2 section, the level of a source block that has not been changed for a second predetermined period may belong to the level 1 section.

Second, predetermined numbers of source blocks may be defined for the respective level sections. That is, a recently changed source block may belong to the level 3 section. If the number of source blocks is defined as 3 for the level 3 section and level 3 is full, the source block of the oldest write history among the source blocks of the level 3 section may be changed to belong to the level 2 section. Likewise, if the number of source blocks is defined as 3 for the level 2 section and level 2 is full, the source block of the oldest write history among the source blocks of the level 2 section may be changed to belong to the level 1 section.

Here, the above-mentioned block level classification operation is only for illustrative purposes, and the scope of the present disclosure is not limited thereto. For example, the block levels determined by the block level determination component 135B may be further subdivided.

Here, a source block provided with a sequence number and a level through the block arrangement component 135A and the block level determination component 1353 will be described with reference to FIG. 6A. FIG. 6A is a timing diagram illustrating source blocks provided with the sequence number SN and set to belong to the level sections by the block level manager 135 in accordance with an embodiment.

Referring to FIG. 6A, a plurality of source blocks may be provided with the sequence numbers SN and corresponding levels are set based on write history through the block level manager 135.

Here, source block 12 (BL12), source block 20 (BL20), and source block 31 (BL31) that are provided respectively with the sequence number 1 (SN1) to sequence number 3 (SN3) may belong to the level 1 section. Source block 4 (BL4), source block 54 (BL54), and source block 6 (BL6) that are respectively provided with the sequence number 4 (SN4) to sequence number 6 (SN6) may belong to the level 2 section. Source block 73 (BL73), source block 80 (BL80), and source block 91 (BL91) that are respectively provided with the sequence number 7 (SN7) to sequence number 9 (SN9) may belong to the level 3 section. Source block 12, source block 20, and source block 31 belonging to the level 1 section may be blocks each having the oldest write history and may be cold blocks. Source block 73, source block 80, and source block 91 belonging to the level 3 section may be most recently changed source blocks and may be hot blocks.

In this way, the block level determination component 135B may determine the levels of the plurality of source blocks according to the sequence numbers representing the write history, and then write the determined level-related information to a block level list 700 included in the memory 144 through the storage 135C. Referring to FIG. 6B, the block level list 700 stores sequence numbers, block information, and block level information of the source blocks. The garbage collection manager to be described below may perform a garbage collection operation using the block level list.

Referring back to FIG. 5, the garbage collection manager 136 may include a garbage collection level determination component 136A, a first garbage collection component 136B, and a second garbage collection component 136C.

The garbage collection level determination component 136A may determine a garbage collection urgent level based on the number of free blocks included in the memory device 150. The garbage collection urgent level may be determined to be either a high level or a low level based on the number of free blocks. The garbage collection urgent level is determined in order to select source blocks included in the cold blocks as victim blocks according to the garbage collection urgent level and perform a garbage collection operation. That is, the garbage collection urgent level is determined to select a source block belonging to the level 1 section set to a cold block as a victim block and perform a garbage collection operation, if the garbage collection urgent level is determined to be a low level according to the garbage collection urgent level, and to select source blocks having a small number of valid pages as victim blocks and perform a garbage collection operation within the shortest time, if the garbage collection urgent level is determined to be a high level according to the garbage collection urgent level. Here, the above-mentioned garbage collection urgent level classification is only for illustrative purposes, and the scope of the present disclosure is not limited thereto. For example, the garbage collection urgent levels to be determined by the garbage collection level determination component may be further subdivided.

The garbage collection level determination component 136A may determine the garbage collection level by comparing a free block count (FBC) and a first threshold value TH1. That is, the garbage collection level determination component 136A compares the FBC with the first threshold value TH1. As a result of the comparison, if the FBC is less than the first threshold value TH1 (FBC<TH1), the garbage collection urgent level is determined to be a high level. If the FBC is equal to or greater than the first threshold value TH1 (FBC TH1), the garbage collection urgent level is determined to be a low level. Depending on the result of the garbage collection urgent level determined through the garbage collection level determination component 136A, the garbage collection manager 136 may determine either a first garbage collection component 136B or a second garbage collection component 136C, which will be described below, and perform a garbage collection operation.

First, the first garbage collection component 136B to be operated when the garbage collection urgent level is determined to be a low level will be described.

The first garbage collection component 136B may include a cold block selector CBS, a first victim block selector VBS1, and a first garbage collection performer GCO1.

If the garbage collection urgent level is determined to be a low level through the garbage collection level determination component 136A, the cold block selector CBS may select a source block belonging to a cold block level section (i.e., the level 1 section) from the block level list. For example, the garbage collection level determination component 136A may select source block 12, source block 20, and source block 31 that belong to the level 1 section, from the block level list. Hereinafter, source block 12, source block 20, and source block 31 may also be expressed as cold block 12, cold block 20, and cold block 31, respectively.

The first victim block selector VBS1 may select, to perform a garbage collection operation, a victim block from among the plurality of cold blocks selected through the cold block selector CBS. A method of selecting, by the first victim block selector VBS1, the victim block from among the plurality of cold blocks may be classified into two methods. First, the first victim block selector VBS1 may select a cold block, having the number of valid pages equal to or greater than a second threshold value TH2, among the plurality of cold blocks, as the victim block for the garbage collection operation. For example, in the case where cold blocks each having the number of valid pages equal to or greater than the second threshold value TH2 are selected from among the plurality of cold blocks, descriptions will be made based on the selected cold blocks are cold block 12 and cold block 20.

Second, the first victim block selector VBS1 may select a cold block, having the number of valid pages less than a predetermined third threshold value TH3, among the plurality of cold blocks, as a victim block for the garbage collection operation. For example, in the case where cold blocks, each having the number of valid pages less than the third threshold value TH3, are selected from among the plurality of cold blocks, descriptions will be made based on the selected cold block being cold block 31.

The first victim block selector VBS1 may select a victim block in the foregoing manner.

The first garbage collection performer GCO1 may copy valid pages of the victim blocks selected by the first victim block selector VBS1 to empty pages of a free block. Next, the first garbage collection performer GCO1 may erase the victim blocks and set the erased victim blocks to free blocks. For example, cold block 12 and cold block 20 that are selected as victim blocks by the first victim block selector VBS1 through the first method will be described. The first garbage collection performer GCO1 may copy valid pages of cold block 12 and cold block 20 selected as victim blocks to empty pages of a free block. Next, after all pages included in cold block 12 and cold block 20 have been erased, cold block 12 and cold block 20 may be set to free blocks. Next, cold block 31 that is selected as a victim block by the first victim block selector VBS1 through the second method will be described. The first garbage collection performer GCO1 may copy valid pages of cold block 31 selected as a victim block to empty pages of a free block. Next, after all pages included in cold block 31 have been erased, cold block 31 may be set to a free block.

In the case where a garbage collection operation is performed on a cold block by the above-mentioned method, since the cold block may also become a free block, the OP space of the cold block which cannot be used in the conventional art may be utilized.

Next, the second garbage collection component 136C to be operated when the garbage collection urgent level is determined to be a high level will be described.

In the case where the garbage collection level determination component 136A determines the garbage collection urgent level to be a high level, the second garbage collection component 136C may be selected and operated in order to generate a free block in a short time.

The second garbage collection component 136C may include a second victim block selector VBS2, and a second garbage collection performer GCO2.

The second victim block selector VBS2 may select a victim block from the entire source blocks, in order to perform a garbage collection operation in a short time. The second victim block selector VBS2 may select a source block, having the number of valid pages less than a fourth threshold value TH4, among the plurality of source blocks as a victim block for the garbage collection operation.

The second garbage collection performer GCO2 may copy valid pages of the victim block selected by the second victim block selector VBS2 to empty pages of a free block. Next, the second garbage collection performer GCO2 may erase the victim block and set the erased victim block to a free block.

Figure 7:
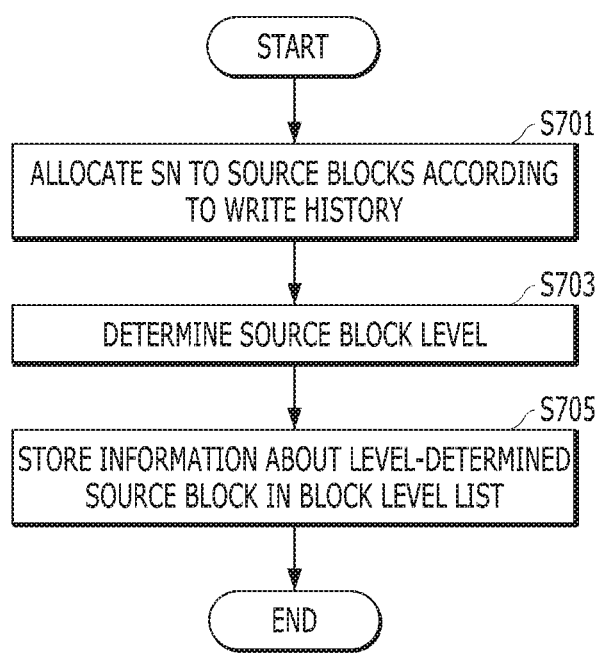
FIGS. 7 to 10 are diagrams for describing a method of operating a memory system in accordance with an embodiment.

FIGS. 7 to 10 are diagrams or describing a method of operating the memory system in accordance with an embodiment. FIG. 7 is a diagram for describing a method of determining a block level for each source block to be updated.

Referring to FIG. 7, at step S701, the block level manager 135 may allocate sequence numbers (SN) to the plurality of respective source blocks in ascending order based on write history. A sequence number is allocated to each of the plurality of source blocks in order to indicate the write history of the plurality of source blocks through the sequence numbers which function as time stamps. Here, each time an open block becomes a source block, the block level manager 135 may allocate a sequence number SN to the source block, or reallocate the sequence number SN to a source block, which is updated among source blocks that have been provided with the sequence numbers SN. The block arrangement component 135A may allocate the sequence number SN to each of the plurality of memory blocks in ascending order according to the write history of the source blocks represented by the sequence numbers. Each time a sequence number SN is allocated to each of the source blocks, the sequence number SN increases by 1. In this way, the sequence numbers SN may be allocated to the source blocks. The sequence numbers SN of the source blocks may indicate the write history of the source blocks.

At step S703, the block level manager 135 may determine a level of each source block according to the corresponding sequence number SN. That is the block level manager 135 may set one of a plurality of levels to the source block based on the sequence number representing the write history. For example, descriptions will be made based on that the plurality of levels are set as the level 1 section, the level 2 section, and the level 3 section. The source blocks of lower level may belong to a lower one among the level sections. As described above, the block arrangement component 135A may allocate the sequence number SN to each of the plurality of memory blocks in ascending order according to the write history of the source blocks represented by the sequence numbers. Therefore, as the level approaches the level 1 section, the corresponding source block may be close to a cold block. The level 1 section may be a section in which source blocks each having the oldest write history belong. Recently become source blocks may belong to the level 3 section as hot blocks. Criteria for classifying the levels into respective sections may be set in various ways. First, the level sections may be classified into level 1 to level 3 sections by setting a predetermined update period for each level. In detail, a recently become source block may belong to the level 3 section. Among the source blocks belonging to the level 3 section, the level of a source block that has not been changed for a first predetermined period may become to belong to the level 2 section. Likewise, among source blocks belonging to the level 2 section, the level of a source block that has not been changed for a second predetermined period may become to belong to the level 1 section.

Second, predetermined numbers of source blocks may be defined for the respective level sections. In other words, a recently become source block may belong to the level 3 section. If the number of source blocks is defined as 3 for the level 3 section and is full, the source block of the oldest write history among the source blocks of the level 3 section may become to belong to the level 2 section. Likewise, if the number of source blocks is defined as 3 for the level 2 section and is full, the source block of the oldest write history among the source blocks of the level 2 section may become to belong to the level 1 section.

At step S705, each time each source block is updated, the allocated sequence number and level information are written to the block level list included in the memory 144. The block level list stores the sequence numbers, the block information, and the block level information.

Figure 8:
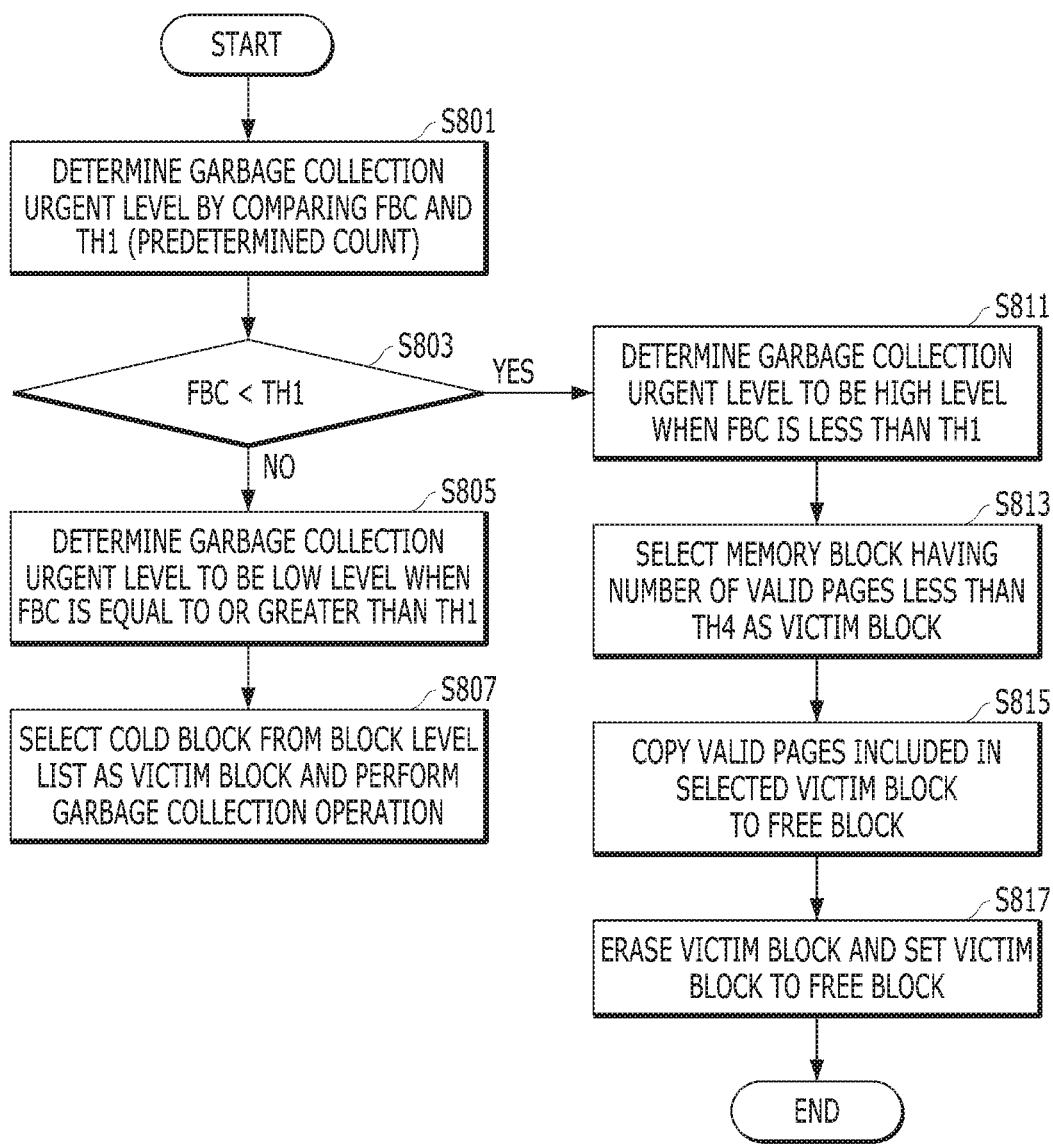
Figure 9:
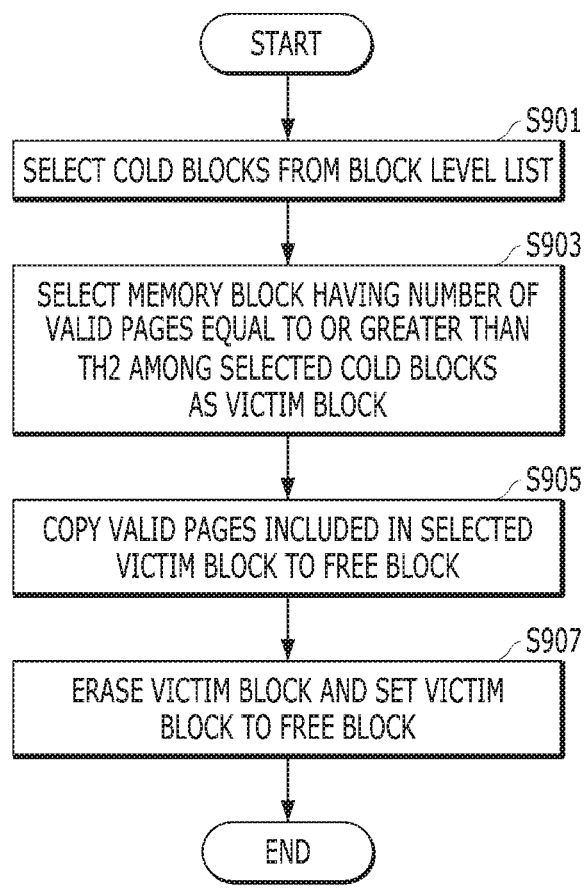
Figure 10:
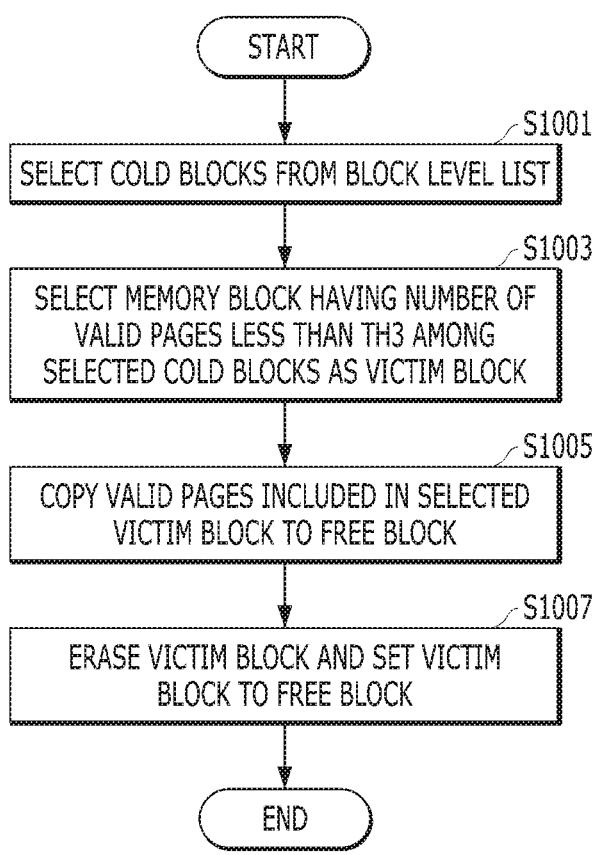

FIGS. 8 to 10 are diagrams for describing a method of performing a garbage collection operation in accordance with an embodiment.

Referring to FIG. 8, at step S801, the garbage collection manager 136 may determine a garbage collection urgent level based on the number of free blocks included in the memory device 150. The garbage collection urgent level may be determined to be either a high level or a low level based on the number of free blocks. The garbage collection urgent level is determined in order to select source blocks included in the cold blocks as victim blocks according to the garbage collection urgent level and perform a garbage collection operation. That is, the is the garbage collection urgent level is determined to select a source block belonging to the level 1 section set to a cold block as a victim block and perform a garbage collection operation, if the garbage collection urgent level is determined to be a low level according to the garbage collection urgent level, and to select source blocks having a small number of valid pages as victim blocks and perform a garbage collection operation within the shortest time, if the garbage collection urgent level is determined to be a high level according to the garbage collection urgent level. Here, the above-mentioned garbage collection urgent level classification is only for illustrative purposes, and the scope of the present disclosure is not limited thereto. For example, the garbage collection urgent levels to be determined by the garbage collection level determination component may be further subdivided.

At step S803, the garbage collection manager 136 performs a comparison operation of checking whether the free block count (FBC) is less than the first threshold value TH1. As a result of the comparison, if the FBC is equal to or greater than the first threshold value TH1 (FBC≥TH1) (NO), at step S805, the garbage collection urgent level is determined to be a low level.

In the case where the garbage collection urgent level is determined to be a low level, at step S807, a victim block may be selected from among cold blocks in the block level list, and a garbage collection operation may be performed. Here, a method of selecting a victim block from among cold blocks will be described with reference to FIGS. 9 and 10.

Referring to FIG. 9, if the garbage collection urgent level is determined to be a low level, at step S901, the garbage collection manager 136 may select a source block belonging to a cold block level section (i.e., the level 1 section) from the block level list.

At step S903, a cold block, having the number of valid pages equal to or greater than a second threshold value TH2, among a plurality of cold blocks selected at step S901, may be selected as a victim block for the garbage collection operation. Here, all of the cold blocks may be selected as victim blocks.

At step S905, the garbage collection manager 136 may copy valid pages of the selected victim blocks to empty pages of a free block.

Thereafter, at step S907, the garbage collection manager 136 may erase the victim blocks and set the erased victim blocks to free blocks.

Referring to FIG. 10, if the garbage collection urgent level is determined to be a low level, at step S1001, the garbage collection manager 136 may select a source block belonging to a cold block level section (i.e., the level 1 section) from the block level list.

At step S1003, a cold block, having the number of valid pages less than a third threshold value TH3 among a plurality of cold blocks selected at step S1001, may be selected as a victim block for the garbage collection operation. Here, all of the cold blocks may be selected as victim blocks.

At step S1005, the garbage collection manager 136 may copy valid pages of the selected victim blocks to empty pages of a free block.

Thereafter, at step S1007, the garbage collection manager 136 may erase the victim blocks and set the erased victim blocks to free blocks.

Referring back to FIG. 8, at step S803, if the FBC is less than the first threshold value TH1 (FBC<TH1) (YES), the garbage collection manager 136 determines the garbage collection urgent level to be a high level, at step S811.

At step S813, to generate a free block in a short time when the garbage collection urgent level is determined to be a high level, a victim block is selected from among valid pages included in the entire source blocks. That is, the garbage collection manager 136 may select, as a victim block, a source block having the number of valid pages less than a fourth threshold value TH4 among the plurality of source blocks.

At step S815, the garbage collection manager 136 may copy valid pages of the selected victim blocks to empty pages of a free block. Thereafter, at step S817, the garbage collection manager 136 may erase the victim blocks and set the erased victim blocks to free blocks.

Figure 11:
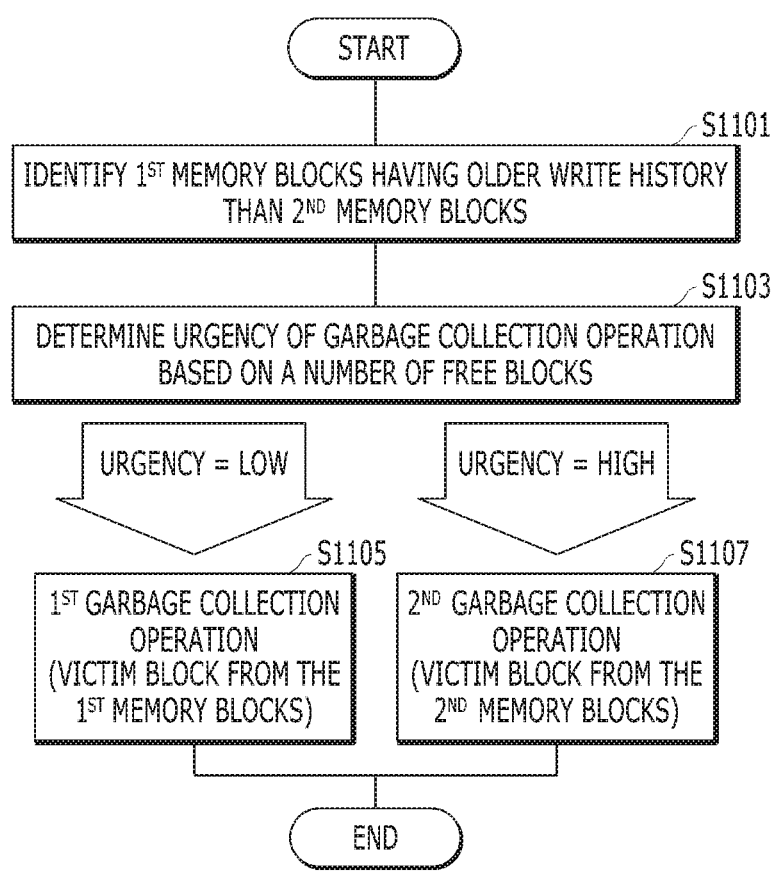
FIG. 11 is a diagram for describing a method of performing a garbage collection operation in accordance with an embodiment.

FIG. 11 is a diagram for describing a method of performing a garbage collection operation in accordance with an embodiment.

Referring to FIG. 11, the controller 130 may identify first memory blocks having an older write history than second memory blocks among plural memory blocks within the memory device 150 at step S1101. In an embodiment, step S1101 may correspond to the process described with reference to FIG. 7. In an embodiment, the first memory blocks may correspond to the cold blocks and the second memory blocks correspond to the hot blocks. In an embodiment, the cold blocks may have older write history than the hot blocks, as described with reference to FIGS. 5 and 6A.

At step S1103, the controller 130 may determine the urgency of a garbage collection operation based on a number of free blocks among the plural memory blocks. In an embodiment, the urgency of a garbage collection operation may be determined as low when the number of free blocks is greater than a third reference value and as high otherwise, as described with reference to step S803 of FIG. 8.

At step S1105, the controller 130 may control the memory device 150 to perform a first garbage collection operation by selecting a victim block among the first memory blocks according to urgency of a garbage collection operation when the urgency of a garbage collection operation is determined as low, as described with reference to steps S801 to S807 of FIG. 8 and the steps of FIGS. 9 and 10. In an embodiment, the victim block may have a greater number of valid pages than a first reference value. In an embodiment, the victim block may have a smaller number of invalid pages than a second reference value.

At step S1107, the controller 130 may control the memory device 150 to perform a second garbage collection operation by selecting the victim block among the second memory blocks when the urgency of a garbage collection operation is determined as high, as described with reference to steps S811 to S817 of FIG. 8. In an embodiment, the victim block may have a smaller number of valid pages than a fourth reference value.

FIGS. 12 to 20 are diagrams illustrating applications of memory systems in accordance with embodiments of the present invention.

Figure 12:
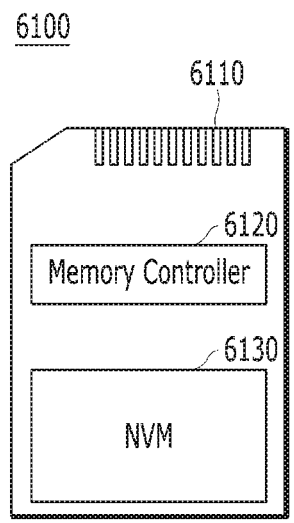
FIGS. 12 to 20 are diagrams illustrating applications of memory systems in accordance with embodiments of the present invention.

FIG. 12 is a diagram illustrating a data processing system including a memory system in accordance with an embodiment. FIG. 12 illustrates a memory card system 6100 to which the memory system is applied.

Referring to FIG. 12, the memory card system 6100 includes a connector 6110, a memory controller 6120 and a memory device 6130.

The memory controller 6120 is connected with, for access to, the memory device 6130, which is implemented as a nonvolatile memory (NVM). For example, the memory controller 6120 controls the read, write, erase, and background operations of the memory device 6130. The memory controller 6120 provides an interface between the memory device 6130 and a host (not shown), and drives firmware for controlling the memory device 6130. That is, the memory controller 6120 may correspond to the controller 20 in the memory system 110 described above with reference to FIG. 1, and the memory device 6130 may correspond to the memory device 30 in the memory system 110 described above with reference to FIG. 1.

Therefore, the memory controller 6120 may include components, such as a random access memory (RAM), a processor, a host interface, a memory interface and an error correction component.

The memory controller 6120 may communicate with an external device, for example, the host 10 described above with reference to FIG. 1, through the connector 6110. For example, as described above with reference to FIG. 1, the memory controller 6120 may be configured to communicate with the external device through at least one of various communication protocols, such as universal serial bus (USB), multimedia card (MMC), embedded MMC (eMMC), peripheral component interconnection (PCI), PCI express (PCIe), advanced technology attachment (ATA), serial ATA, parallel ATA, small computer system interface (SCSI), enhanced small disk interface (ESDI), integrated drive electronics (IDE), Firewire, universal flash storage (UFS), WiFi or Wi-Fi and Bluetooth. Accordingly, the memory system and the data processing system in accordance with an embodiment may be applied to wired and/or wireless electronic appliances, particularly a mobile electronic appliance.

The memory device 6130 may be implemented by a nonvolatile memory, such as an electrically erasable and programmable ROM (EPROM), a NAND flash memory, a NOR flash memory, a phase-change RAM (PRAM), a resistive RAM (ReRAM), a ferroelectric RAM (FRAM) and/or a spin torque transfer magnetic RAM (STT-MRAM).

The controller 6120 and the memory device 6130 may be integrated into one semiconductor device to form a solid state drive (SSD), or a memory card, such as a PC card (e.g., personal computer memory card international association (PCMCIA)), a compact flash card (CF), a smart media card (e.g., SM and SMC), a memory stick, a multimedia card (e.g., MMC, RS-MMC, MMCmicro and eMMC), a secure digital (SD) card (e.g., SD, miniSD, microSD and SDHC) or a universal flash storage (UFS).

Figure 13:
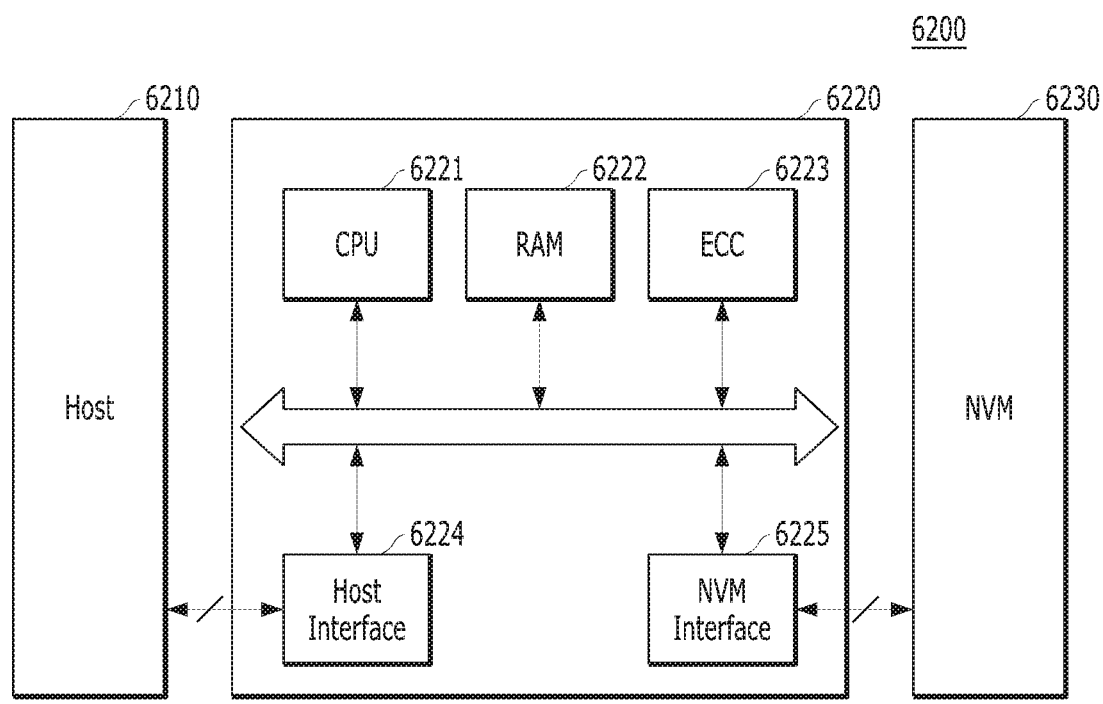

FIG. 13 is a diagram illustrating a data processing system 6200 including a memory system in accordance with an embodiment.

Referring to FIG. 13, the data processing system 6200 includes a memory device 6230 which is implemented by at least one nonvolatile memory (NVM) and a memory controller 6220 which controls the memory device 6230. The data processing system 6200 may be a storage medium, such as a memory card (e.g., CF, SD and microSD). The memory device 6230 may correspond to the memory device 30 in the memory system 110 described above with reference to FIG. 1, and the memory controller 6220 may correspond to the controller 20 in the memory system 110 described above with reference to FIG. 1.

The memory controller 6220 controls read, write, and erase operations for the memory device 6230 in response to requests from a host 6210. The memory controller 6220 includes at least one CPU 6221, a buffer memory, for example, a RAM 6222, an ECC circuit 6223, a host interface 6224, and a memory interface, for example, an NVM interface 6225.

The CPU 6221 may control general operations for the memory device 6230, for example, read, write, file system management, bad page management, and the like. The RAM 6222 operates according to control of the CPU 6221, and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory, the RAM 6222 is used to buffer data to be transmitted from the host 6210 to the memory device 6230 or from the memory device 6230 to the host 6210. In the case where the RAM 6222 is used as a cache memory, the RAM 6222 may be used to enable the memory device 6230 to operate at a higher speed.

The ECC circuit 6223 generates an error correction code (ECC) for correcting a failed bit or an error bit in the data received from the memory device 6230. Also, the ECC circuit 6223 performs error correction encoding for data to be provided to the memory device 6230, and generates data with added parity bits. The parity bits may be stored in the memory device 6230. The ECC circuit 6223 may perform error correction decoding for data outputted from the memory device 6230. The ECC circuit 6223 may correct errors by using the parity bits. For example, the ECC circuit 6223 may correct errors by using various coded modulations, such as an LDPC code, a BCH code, a turbo code, a Reed-Solomon code, a convolution code, an RSC, a TCM and a BCM.

The memory controller 6220 exchanges data with the host 6210 through the host interface 6224, and exchanges data with the memory device 6230 through the NVM interface 6225. The host interface 6224 may be connected with the host 6210 through a PATA bus, a SATA bus, an SCSI, a USB, a PCIe or a NAND interface. Further, as a wireless communication function or a mobile communication protocol such as WiFi or long term evolution (LTE) is implemented, the memory controller 6220 may transmit and receive data by being connected with an external device, for example, the host 6210 or another external device. Specifically, as the memory controller 6220 is configured to communicate with an external device through at least one among various communication protocols, the memory system and the data processing system in accordance with an embodiment may be applied to wired and/or wireless electronic appliances, particularly a mobile electronic appliance.

Figure 14:
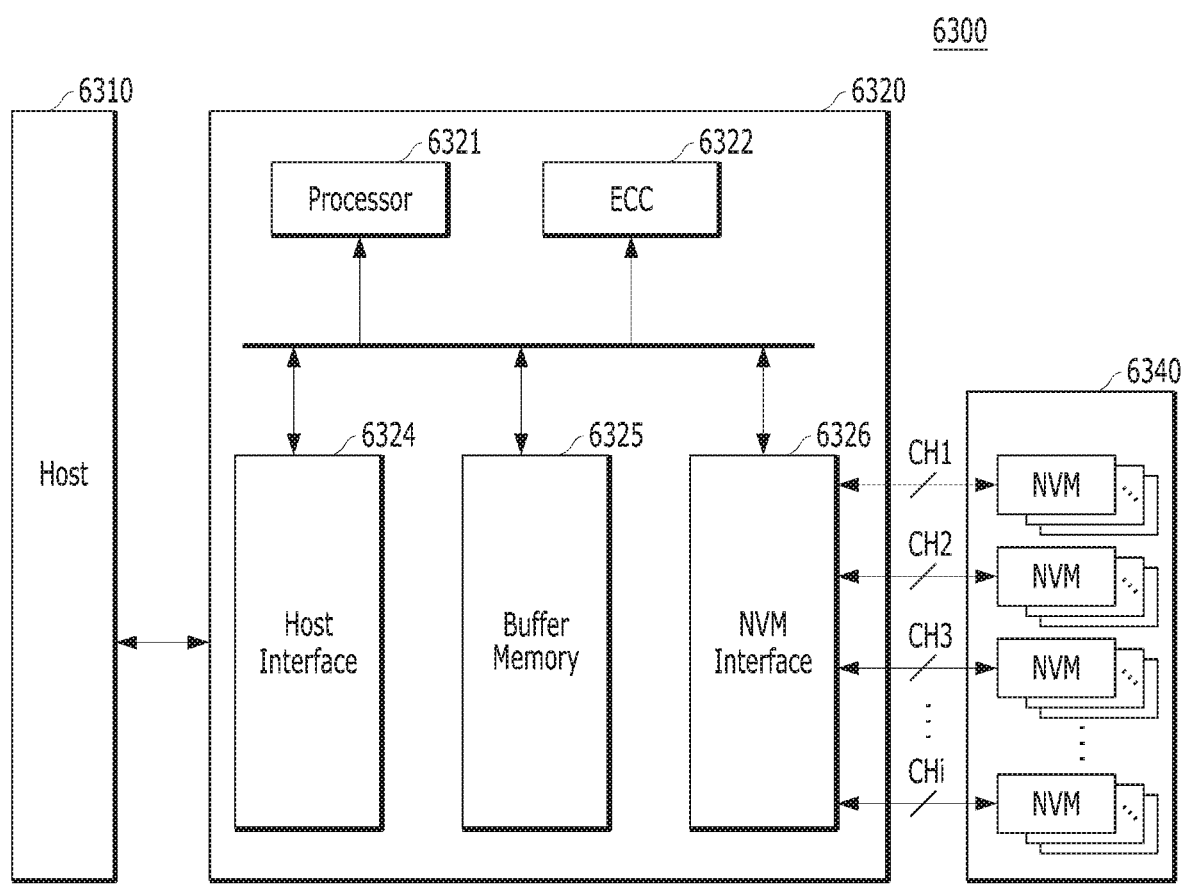

FIG. 14 is a diagram illustrating a data processing system including a memory system in accordance with an embodiment. FIG. 14 illustrates a solid state drive (SSD) 6300 to which the memory system is applied.

Referring to FIG. 14, the SSD 6300 includes a controller 6320 and a memory device 6340 which includes a plurality of nonvolatile memories (NVM). The controller 6320 may correspond to the controller 20 in the memory system 110 described above with reference to FIG. 1, and the memory device 6340 may correspond to the memory device 30 in the memory system 110 described above with reference to FIG. 1.

The controller 6320 is connected with the memory device 6340 through a plurality of channels CH1, CH2, CH3, ... and CHi. The controller 6320 includes at least one processor 6321, an ECC circuit 6322, a host interface 6324, a buffer memory 6325, and a memory interface, for example, a nonvolatile memory interface 6326.

The buffer memory 6325 temporarily stores data received from a host 6310 or data received from a plurality of flash memories NVMs included in the memory device 6340, or temporarily stores metadata of the plurality of flash memories NVMs, for example, map data including mapping tables. The buffer memory 6325 may be realized by a volatile memory including, but not limited to, a DRAM, an SDRAM, a DDR SDRAM, an LPDDR SDRAM and a GRAM, or a nonvolatile memory including, but not limited to, an FRAM, an ReRAM, an STT-MRAM and a PRAM. While it is illustrated in FIG. 13 that the buffer memory 6325 is disposed inside the controller 6320, the buffer memory 6325 may be disposed external to the controller 6320.

The ECC circuit 6322 calculates error correction code values of data to be programmed in the memory device 6340 in a program operation. The ECC circuit 6322 performs an error correction operation for data read from the memory device 6340, based on the error correction code values, in a read operation. The ECC circuit 6322 performs an error correction operation for data recovered from the memory device 6340 in a recovery operation for failed data.

The host interface 6324 provides an interface function with respect to an external device, for example, the host 6310, and the nonvolatile memory interface 6326 provides an interface function with respect to the memory device 6340 which is connected through the plurality of channels CH1, CH2, CH3, ... and CHi.

As a plurality of SSDs 6300 to each of which the memory system 110 is applied are used, a data processing system, for example, a redundant array of independent disks (RAID) system may be implemented. In the RAID system, the plurality of SSDs 6300 and a RAID controller for controlling the plurality of SSDs 6300 may be included. In the case of performing a program operation by receiving a write command from the host 6310, the RAID controller may select at least one memory system, that is, at least one SSD 6300, corresponding to the RAID level information of the received write command received, among a plurality of RAID levels, that is, the plurality of SSDs 6300, and may output data corresponding to the write command to the selected SSD 6300. Also, in the case of performing a read operation by receiving a read command from the host 6310, the RAID controller may select at least one memory system, that is, at least one SSD 6300, corresponding to the RAID level information of the received read command, among the plurality of RAID levels, that is, the plurality of SSDs 6300, and may provide data outputted from the selected SSD 6300 to the host 6310.

Figure 15:
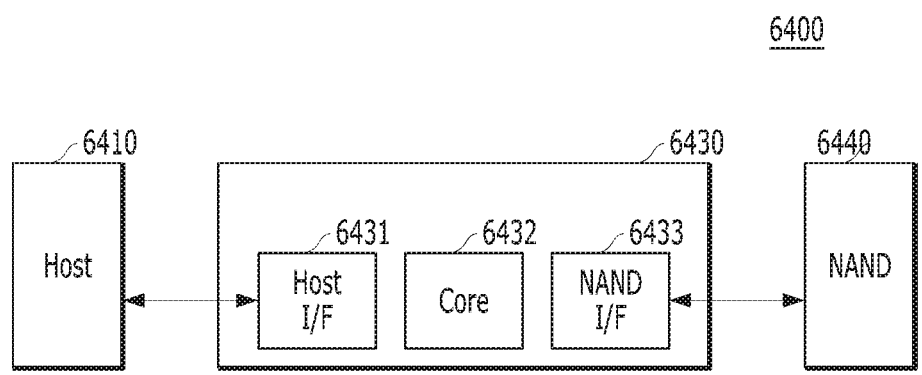

FIG. 15 is a diagram illustrating a data processing system including a memory system in accordance with an embodiment. FIG. 14 illustrates an embedded multimedia card (eMMC) 6400 to which the memory system is applied.

Referring to FIG. 15, the eMMC 6400 includes a controller 6430 and a memory device 6440 which is implemented by at least one NAND flash memory. The controller 6430 may correspond to the controller 20 in the memory system 110 described above with reference to FIG. 1, and the memory device 6440 may correspond to the memory device 30 in the memory system 110 described above with reference to FIG. 1.

The controller 6430 is connected with the memory device 6440 through a plurality of channels. The controller 6430 includes at least one core 6432, a host interface (I/F) 6431, and a memory interface, i.e., a NAND interface (I/F) 6433.

The core 6432 controls general operations of the eMMC 6400. The host interface 6431 provides an interface function between the controller 6430 and a host 6410. The NAND interface 6433 provides an interface function between the memory device 6440 and the controller 6430. For example, the host interface 6431 may be a parallel interface, for example, an MMC interface, as described above with reference to FIG. 1, or may be a serial interface, for example, an ultra high speed (UHS)-I/UHS-II and/or a UFS interface.

FIGS. 16 to 19 are diagrams illustrating examples of data processing systems including a memory system in accordance with embodiments. Each of FIGS. 16 to 19 illustrates a universal flash storage (UFS) to which the memory system is applied.

Referring to FIGS. 16 to 19, respective UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The respective hosts 6510, 6610, 6710 and 6810 may be wired and/or wireless electronic appliances, in particular, application processors of mobile electronic appliances or the like. The respective UFS devices 6520, 6620, 6720 and 6820 may be embedded UFS devices. The respective UFS cards 6530, 6630, 6730 and 6830 may be external embedded UFS devices or removable UFS cards.

In the respective UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with external devices, for example, wired and/or wireless electronic appliances, in particular, mobile electronic appliances or the like, through UFS protocols. The UFS devices 6520, 6620, 6720 and 6820 and the UFS cards 6530, 6630, 6730 and 6830 may be implemented as the memory system 110 described above with reference to FIG. 1. For example, in the respective UFS systems 6500, 6600, 6700 and 6800, the UFS devices 6520, 6620, 6720 and 6820 may be implemented in the form of the data processing system 6200, the SSD 6300 or the eMMC 6400 described above with reference to FIGS. 13 to 15, and the UFS cards 6530, 6630, 6730 and 6830 may be implemented in the form of the memory card system 6100 described above with reference to FIG. 12.

In the respective UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may perform communication through the universal flash storage (UFS) interface, for example, MIPI M-PHY and MIPI Unified Protocol (UniPro) in Mobile Industry Processor Interface (MIPI). The UFS devices 6520, 6620, 6720 and 6820 and the UFS cards 6530, 6630, 6730 and 6830 may perform communication through another protocol other than the UFS protocol, for example, any of various card protocols, such as universal storage bus (USB) Flash Drives (UFDs), multi-media card (MMC), secure digital (SD), mini SD and Micro SD.

Figure 16:
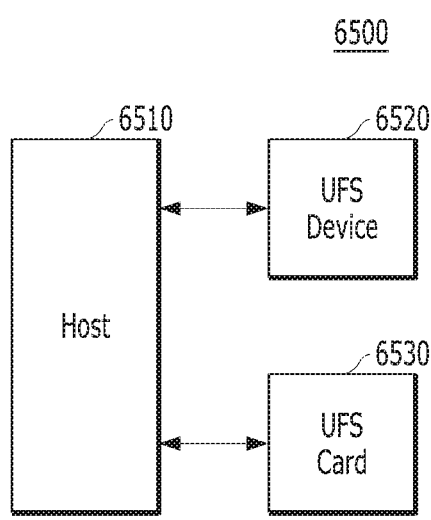

In the UFS system 6500 shown in FIG. 16, UniPro exists in each of the host 6510, the UFS device 6520 and the UFS card 6530. The host 6510 performs a switching operation to perform communication with each of the UFS device 6520 and the UFS card 6530. In particular, the host 6510 performs communication with the UFS device 6520 or the UFS card 6530, through link layer switching in UniPro, for example, L3 switching. The UFS device 6520 and the UFS card 6530 may perform communication through link layer switching in the UniPro of the host 6510. While it is described as an example that one UFS device 6520 and one UFS card 6530 are coupled to the host 6510, it is noted that a plurality of UFS devices and a plurality of UFS cards may be coupled to the host 6510 in a parallel or a star type arrangement. Also, a plurality of UFS cards may be coupled to the UFS device 6520 in any of a parallel, a star, a serial or a chain type arrangement.

Figure 17:
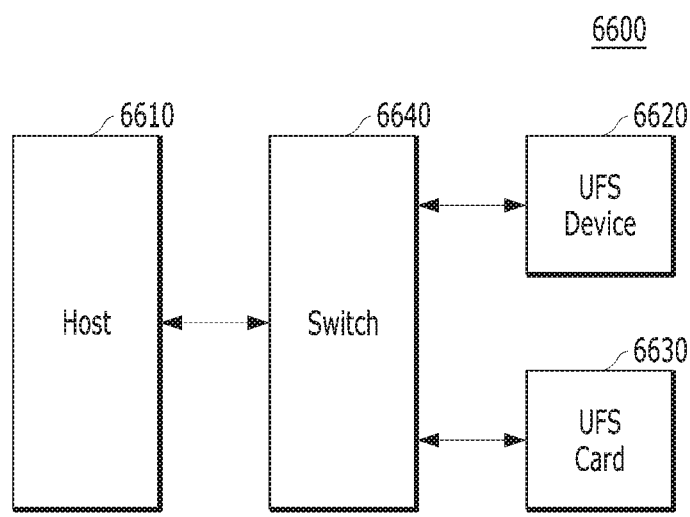

In the UFS system 6600 shown in FIG. 17, UniPro exists in each of the host 6610, the UFS device 6620 and the UFS card 6630. The host 6610 performs communication with the UFS device 6620 or the UFS card 6630 through a switching component 6640 which performs a switching operation, in particular, a switching component 6640 which performs link layer switching in UniPro, for example, an L3 switching operation. The UFS device 6620 and the UFS card 6630 may perform communication through link layer switching in the UniPro of the switching component 6640. While it is described as an example that one UFS device 6620 and one UFS card 6630 are coupled to the switching component 6640, it is noted that a plurality of UFS devices and a plurality of UFS cards may be coupled to the switching component 6640 in a parallel type or a star type arrangement. Also, a plurality of UFS cards may be coupled to the UFS device 6620 in any of a parallel, a star, a serial or a chain type arrangement.

Figure 18:
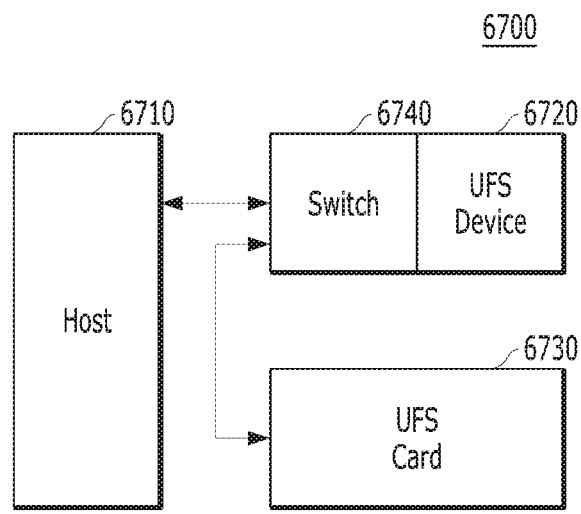

In the UFS system 6700 shown in FIG. 18, UniPro exists in each of the host 6710, the UFS device 6720 and the UFS card 6730. The host 6710 performs communication with the UFS device 6720 or the UFS card 6730 through a switching component 6740 which performs a switching operation, in particular, the switching component 6740 which performs link layer switching in UniPro, for example, an L3 switching operation. The UFS device 6720 and the UFS card 6730 may perform communication through link layer switching in the UniPro of the switching component 6740. The switching component 6740 may be implemented as one component with the UFS device 6720 inside or outside the UFS device 6720. While it is described as an example that one UFS device 6720 and one UFS card 6730 are coupled to the switching component 6740, it is noted that a plurality of circuitries in which the switching component 6740 and the UFS device 6720 are respectively implemented may be coupled to the host 6710 in a parallel type or a star type arrangement. Also, respective circuitries may be coupled in a serial type or a chain type arrangement, or a plurality of UFS cards may be coupled to the switching component 6740 in a parallel type or a star type arrangement.

Figure 19:
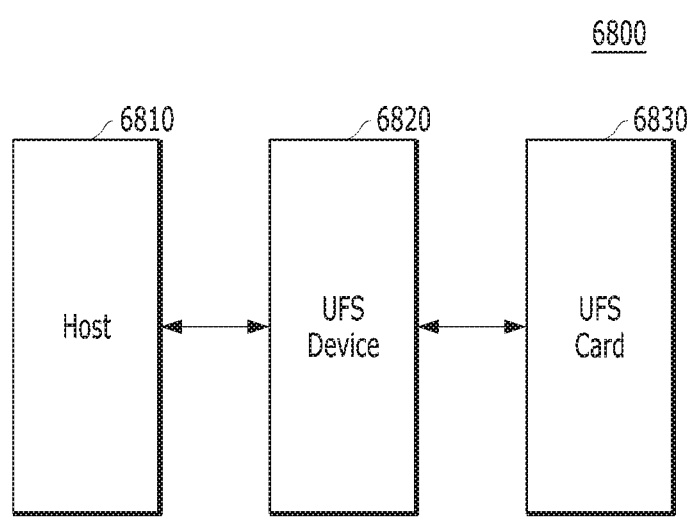

In the UFS system 6800 shown in FIG. 19, M-PHY and UniPro exist in each of the host 6810, the UFS device 6820 and the UFS card 6830. The UFS device 6820 performs a switching operation to perform communication with the host 6810 and the UFS card 6830. In particular, the UFS device 6820 performs communication with the host 6810 or the UFS card 6830, through switching between M-PHY and UniPro circuitries for communication with the host 6810 and M-PHY and UniPro circuitries for communication with the UFS card 6830, for example, target identifier (ID) switching. The host 6810 and the UFS card 6830 may perform communication through target ID switching between M-PHY and UniPro circuitries of the UFS device 6820. While it is described as an example that one UFS device 6820 is coupled to the host 6810 and one UFS card 6830 is coupled to one UFS device 6820, it is noted that a plurality of UFS devices may be coupled to the host 6810 in a parallel type or a star type arrangement. Also, a plurality of UFS cards may be coupled to one UFS device 6820 in any of a parallel, a star, a serial, or a chain type arrangement.

Figure 20:
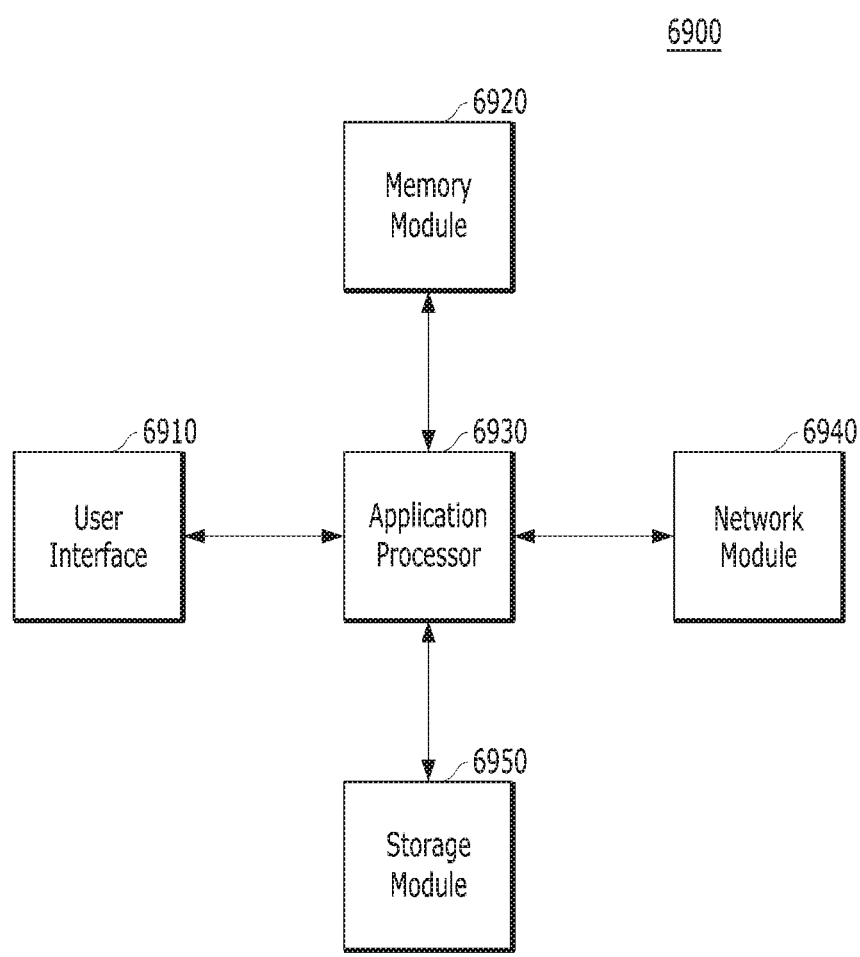

FIG. 20 is a diagram illustrating a data processing system including a memory system in accordance with an embodiment. FIG. 20 illustrates a user system 6900 to which the memory system is applied.

Referring to FIG. 20, the user system 6900 includes a user interface 6910, a memory component 6920, an application processor 6930, a network component 6940, and a storage component 6950.

The application processor 6930 drives components included in the user system 6900 and an operating system (OS). For example, the application processor 6930 may include controllers for controlling the components included in the user system 6900, interfaces, graphics engines, and other components. The application processor 6930 may be provided as a system-on-chip (SoC).

The memory component 6920 may operate as a main memory, a working memory, a buffer memory or a cache memory of the user system 6900. The memory component 6920 may include a volatile random access memory, such as a DRAM, an SDRAM, a DDR SDRAM, a DDR2 SDRAM, a DDR3 SDRAM, an LPDDR SDRAM, an LPDDR2 SDRAM and/or an LPDDR3 SDRAM, or a nonvolatile random access memory, such as a PRAM, an ReRAM, an MRAM and/or an FRAM. For example, the application processor 6930 and the memory component 6920 may be mounted as a package-on-package (PoP).

The network component 6940 may communicate with external devices. For example, the network component 6940 may support not only wired communications but also various wireless communications, such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), and the like, and may thereby communicate with wired and/or wireless electronic appliances, particularly a mobile electronic appliance. As a result, the memory system and the data processing system may be applied to wired and/or wireless electronic appliances. The network component 6940 may be included in the application processor 6930.

The storage component 6950 may store data, for example, data received from the application processor 6930, and transmit data stored therein to the application processor 6930. The storage component 6950 may be implemented by any of a nonvolatile memory, such as a phase-change RAM (PRAM), a magnetic RAM (MRAM), a resistive RAM (ReRAM), a NAND flash memory, a NOR flash memory and a 3-dimensional NAND flash memory. Also, the storage component 6900 may be provided as a removable storage medium such as a memory card of the user system 6900 or an external drive. That is, the storage component 6950 may correspond to the memory system 110 described above with reference to FIG. 1, and may be implemented as the SSD, eMMC and UFS described above with reference to FIGS. 12 to 17.

The user interface 6910 may include interfaces for inputting data or commands to the application processor 6930 or for outputting data to an external device. For example, the user interface 6910 may include user input interfaces, such as a keyboard, a keypad, a button, a touch panel, a touch screen, a touch pad, a touch ball, a camera, a microphone, a gyroscope sensor, a vibration sensor and a piezoelectric element, and user output interfaces, such as a liquid crystal display (LCD), an organic light emitting diode (OLED) display device, an active matrix OLED (AMOLED) display device, an LED, a speaker and a motor.

In the case where the memory system 110 described above with reference to FIG. 1 is applied to the mobile electronic appliance of the user system 6900 in accordance with an embodiment, the application processor 6930 controls general operations of the mobile electronic appliance, and the network component 6940 as a communication component controls wired and/or wireless communication with an external device, as described above. The user interface 6910 as the display and touch component of the mobile electronic appliance displays data processed by the application processor 6930 or supports input of data from a touch panel.

In various embodiments, levels for a plurality of memory blocks may be determined based on write history of the memory blocks, and a cold block may be managed based on the determined levels. When the number of free blocks of the plurality of memory blocks is equal to or greater than a threshold value, a garbage collection operation may be performed on the cold block. Therefore, over provisioning (OP) space included in the cold block may be efficiently used.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
   a memory device including a plurality of memory blocks; and
   a controller configured to control the memory device,
   wherein the controller is
   configured to compare a free block count and a first threshold value, select a cold block, determined based on write history of writing data to the memory device, among the plurality of memory blocks when the free block count is equal to or greater than the first threshold value, and perform a garbage collection operation for a selected block.

2. The memory system of claim 1, wherein the controller comprises a block level manager configured to a level for each of the plurality of memory blocks based on the write history, and
   wherein the block level manager comprises:
   a block arrangement component configured to allocate a sequence number to each of the plurality of memory blocks based on the write history;

a block level determination component configured to set one of a plurality of levels for each of the plurality of memory blocks according to the sequence number; and
a storage configured to store information about the memory blocks corresponding to sequence numbers and the set levels in a block level list.

3. The memory system of claim 2, wherein the block arrangement component allocates the sequence number for each of the plurality of memory blocks in ascending order according to the write history.

4. The memory system of claim 2,
wherein the plurality of levels include first to N-th level sections,
wherein the block level manager determines the level and the level section for each of the plurality of memory blocks such that a memory block having a lower sequence number among the allocated sequence numbers belongs to a lower level section among the first to N-th level sections, and
wherein the cold block belongs to the first level section and a hot block belongs to the N-th level section.

5. The memory system of claim 4, wherein the block level manager adjusts the level section for each of the plurality of memory blocks based on one of write history of the memory block and predetermined numbers of the first to N-th level sections.

6. The memory system of claim 1, wherein the controller comprises a garbage collection manager configured to determine a garbage collection urgent level based on a comparison result of the free block count and the first threshold value, and
wherein the garbage collection manager comprises:
a garbage collection level determination component configured to determine the garbage collection urgent level by comparing the free block count and the first threshold value;
a first garbage collection component configured to perform, when the determination result indicates that the free block count is equal to or greater than the first threshold value, a first garbage collection operation; and
a second garbage collection component configured to perform, when the determination result indicates that the free block count is less than the first threshold value, a second garbage collection operation.

7. The memory system of claim 6, wherein the first garbage collection component comprises:
a first victim block selector configured to select one or more victim blocks among the cold blocks corresponding to the first level; and
a first garbage collection performer configured to copy valid pages included in the victim blocks to empty pages of a free block, erase the victim blocks and set the erased victim blocks to free blocks,
wherein the first victim block selector selects, as the victim blocks, one or more cold blocks in an increasing number of invalid pages, or in a decreasing number of valid pages, among the cold blocks.

8. The memory system of claim 6, wherein the second garbage collection component comprises:
a second victim block selector configured to select one or more victim blocks among the plurality of memory blocks; and
a second garbage collection performer configured to copy valid pages included in the victim blocks to empty pages of a free block, erase the victim blocks and set the erased victim blocks to free blocks, wherein the second victim block selector selects, as the victim blocks, one or more memory blocks in a decreasing number of valid pages among the plurality of memory blocks.

9. A method of operating a memory system including a memory device including a plurality of memory blocks, and a controller configured to control the memory device, the method comprising:
determining a level for each of the plurality of memory blocks based on write history of writing data to the memory device to manage a cold block based on the level; and
determining a garbage collection urgent level based on a result of comparing a free block count and a first threshold value;
selecting the cold block when the free block count is equal to or greater than the first threshold value; and
performing a garbage collection operation for a selected block.

10. The method of claim 9, wherein the determining of the level for each of the plurality of memory blocks based on the write history of writing data to the memory device to manage the cold block based on the level comprises:
allocating a sequence number to each of the plurality of memory blocks based on the write history;
setting one of a plurality of levels to each of the plurality of memory blocks according to the sequence number; and
storing information about the memory blocks corresponding to sequence numbers and the set levels in a block level list.

11. The method of claim 10, wherein the allocating of the sequence number to each of the plurality of memory blocks based on the write history comprises:
allocating the sequence number for each of the plurality of memory blocks in ascending order according to the write history.

12. The method of claim 10,
wherein the plurality of levels include first to N-th level sections,
wherein the level and the level section for each of the plurality of memory blocks are determined such that a memory block of a lower sequence number among the allocated sequence numbers belongs to a lower level section among the first to N-th level sections, and
wherein the cold block belongs to the first level section and a hot block belongs to the N-th level section.

13. The method of claim 12, wherein the level section is adjusted for each of the plurality of memory blocks based on one of write history of the memory block and predetermined numbers of the first to N-th level sections.

14. The method of claim 9, wherein the performing the garbage collection operation for the cold block comprises:
performing, when the determination result indicates that the free block count is equal to or greater than the first threshold value, a first garbage collection operation; and
performing, when the determination result indicates that the free block count is less than the first threshold value, a second garbage collection operation.

15. The method of claim 14, wherein the performing of the first garbage collection operation comprises:
when one or more victim blocks is selected among the cold blocks corresponding to the first level,
copying valid pages included in the victim blocks to empty pages of a free block, erasing the victim blocks and setting the erased victim blocks to free blocks.

16. The method of claim 15, wherein the one or more victim blocks is selected among the cold blocks in an increasing number of valid pages, or in a decreasing number of invalid pages, among the cold blocks.

17. The method of claim 14, wherein the performing of the second garbage collection operation comprises:
when selecting one or more victim blocks is selected among the plurality of memory blocks,
copying valid pages included in the victim blocks to empty pages of a free block, erasing the victim blocks and setting the erased victim blocks to free blocks.

18. The method of claim 17, wherein the one or more victim blocks is selected among the plurality of memory blocks in a decreasing number of valid pages among the plurality of memory blocks.

19. An operating method of a controller, the operating method comprising:
identifying first memory blocks having an older write history than second memory blocks among plural memory blocks within a memory device;
identifying third memory blocks having a smaller number of valid pages than fourth memory block among the plural memory block; and
controlling the memory device to perform a first garbage collection operation by selecting a victim block among the first memory blocks when a free block count is equal to or greater than a first threshold value.

20. The operating method of claim 19, wherein the victim block is selected in an increasing number of valid pages.

21. The operating method of claim 19, wherein the victim block is selected in a decreasing number of invalid pages.

22. The operating method of claim 19, further comprising determining urgency of a garbage collection operation based on a number of free blocks among the plural memory blocks.

23. The operating method of claim 22, wherein the urgency of the garbage collection operation is determined as low when the number of free blocks is greater than a third reference value and as high otherwise.

24. The operating method of claim 23, the memory device is controlled to perform the first garbage collection operation when the urgency of a garbage collection operation is determined as low.

25. The operating method of claim 19, further comprising controlling the memory device to perform a second garbage collection operation by selecting the victim block among the third memory blocks when the free block count is less than the first threshold value.

26. The operating method of claim 25, wherein the victim block is selected among the plural memory block in a decreasing number of valid pages among the plurality of memory blocks.

27. The memory system of claim 1, wherein the controller is configured to select a victim block, determined based on a number of valid pages, among the plurality of memory blocks when the free block count is less than the first threshold value.

28. The method of claim 9, further comprising selecting a victim block, determined based on a number of valid pages, among the plurality of memory blocks when the free block count is less than the first threshold value.

* * * * *